US010375094B2

(12) United States Patent
Shibata et al.

(10) Patent No.: US 10,375,094 B2
(45) Date of Patent: Aug. 6, 2019

(54) WIRELESS SENSOR NETWORK SECURITY

(71) Applicant: Hitachi, Ltd., Tokyo (JP)

(72) Inventors: Takeshi Shibata, San Jose, CA (US); Sudhanshu Gaur, Santa Clara, CA (US)

(73) Assignee: Hitachi, Ltd., Tokyo (JP)

( * ) Notice: Subject to any disclaimer, the term of this patent is extended or adjusted under 35 U.S.C. 154(b) by 266 days.

(21) Appl. No.: 15/284,621

(22) Filed: Oct. 4, 2016

(65) Prior Publication Data

US 2018/0097830 A1 Apr. 5, 2018

(51) Int. Cl.
*H04L 29/00* (2006.01)
*H04L 29/06* (2006.01)
(Continued)

(52) U.S. Cl.
CPC ........ *H04L 63/1425* (2013.01); *G06F 21/552* (2013.01); *G06F 21/577* (2013.01); *H04L 67/12* (2013.01); *H04L 67/18* (2013.01); *H04L 67/28* (2013.01); *H04L 67/2814* (2013.01); *H04W 12/12* (2013.01); *G06F 2221/2111* (2013.01); *G06F 2221/2151* (2013.01)

(58) Field of Classification Search
CPC .... H04L 63/1425; H04L 67/12; H04W 12/12; G06F 2221/2111; G06F 2221/2151
See application file for complete search history.

(56) References Cited

U.S. PATENT DOCUMENTS 9,301,100 B1 * 3/2016 Jampani ................. G01S 5/0278
2015/0154842 A1 * 6/2015 Wappler ............. G08B 13/2462
340/572.7

(Continued)

OTHER PUBLICATIONS

V. Pierlot, et al., "A New Three Object Triangulation Algorithm Based on the Power Center of Three Circles", Research and Education in Robotic (EUROBOT), vol. 161 of Communications in Computer and Information Science, pp. 248-262, 2011, Springer. {vpierlot, M.VanDroogenbroeck}@ulg.ac.be.

(Continued)

*Primary Examiner* — Brandon S Hoffman
*Assistant Examiner* — Helai Salehi
(74) *Attorney, Agent, or Firm* — Mattingly & Malur, PC

(57) ABSTRACT

In some examples, a computing device may receive sensed data of a first sensor sent in a first transmission. The computing device may associate a first timestamp with the sensed data. Further, the computing device may receive, from other sensors, first signal strength information including first signal strength data and a first signal property related to the first transmission, and a second timestamp corresponding to detection of the first transmission. The computing device may receive, from other sensors, second signal strength information including second signal strength data and a second signal property related to a second transmission, and a third timestamp corresponding to detection of the second transmission. When the third timestamp is later than the first timestamp and the first signal property matches the second signal property, the computing device may indicate that a sensor that sent the second transmission is associated with an anomaly.

20 Claims, 28 Drawing Sheets

(51) Int. Cl.
    *H04L 29/08*     (2006.01)
    *H04W 12/12*     (2009.01)
    *G06F 21/55*     (2013.01)
    *G06F 21/57*     (2013.01)

(56) References Cited

U.S. PATENT DOCUMENTS

2016/0337809 A1* 11/2016 Narasimha ............ G01S 5/0289
2017/0055131 A1*  2/2017 Kong .................... H04W 4/027

OTHER PUBLICATIONS

Theodore S. Rappaport, "Wireless Communications", Principles and Practice, 2nd Edition, Prentice Hall, Dec. 31, 2001, pp. 68-69.

* cited by examiner

1200

1202  1204  1206  1208  1210

| Com# | Timestamp at Gtwy | Timestamp | Sensor ID | Data (temp °F) |
|---|---|---|---|---|
| 1 | 01:00:01 | 01:00:00 | X | 61 |
| 2 | 02:00:01 | 02:00:00 | X | 62 |
| ⋮ | ⋮ | ⋮ | ⋮ | ⋮ |

| 1302 | 1304 | 1306 | 1308 | | |
|---|---|---|---|---|---|
| Seq. # | Timestamp | Sensor ID | Data:SS[dBm] , Freq., Duration | | |
| 1 | 01:00:01 | A | -40 | F1 | T1 |
| 2 | 01:00:01 | B | -50 | F1 | T1 |
| 3 | 01:00:01 | C | -30 | F1 | T1 |
| 4 | 01:00:02 | A | -45 | F2 | T1 |
| 5 | 01:00:02 | B | -25 | F2 | T1 |
| 6 | 01:00:02 | D | -55 | F2 | T1 |
| 7 | 02:00:01 | A | -40 | F1 | T2 |
| 8 | 02:00:01 | B | -50 | F1 | T2 |
| 9 | 02:00:01 | C | -30 | F1 | T2 |
| 10 | 02:00:01 | E | -65 | F1 | T2 |
| ⋮ | ⋮ | ⋮ | ⋮ | | |

| Item# | Timestamp | SS Data | Loc. | Dur. |
|---|---|---|---|---|
| 1 | 01:00:01 | A: -40, B: -50, C: -30 | P1 | T1 |
| 2 | 01:00:02 | A: -45, B: -55, D: -40 | P2 | T1 |
| 3 | 02:00:01 | A: -40, B: -50, C: -30 | P3 | T2 |
| 4 | 02:00:01 | B:-50, C:-30, E:-55 | P4 | T2 |
| 5 | 02:00:01 | C:-30, E:-55, A:-40 | P5 | T2 |
| 6 | 02:00:01 | E: -65, A: -40, B: -50 | P6 | T2 |
| ⋮ | ⋮ | ⋮ | ⋮ | ⋮ |

1402

| Item # | Timestamp | Location | Duration |
|---|---|---|---|
| 1 | 01:00:01 | P1 | T1 |
| 2 | 01:00:02 | P2 | T1 |
| 3 | 02:00:01 | (P3 + P4 + P5 + P6) / 4 | T2 |
| ⋮ | ⋮ | ⋮ | ⋮ |

1404

| Item# | Series | Sensor ID | Location | Note |
|---|---|---|---|---|
| 1 | S1 | X | Px1 = P1 | |
| 2 | S1 | Unknown | Pu = P2 | Anomaly Cnddt |
| 3 | S2 | X | Px2=(P3+P4+P5+P6)/4 | |
| ⋮ | ⋮ | ⋮ | ⋮ | ⋮ |

| Item# | Sensor ID | Location |
|---|---|---|
| 1 | X | Pxi |
| 2 | A | Pai |
| 3 | B | Pbi |
| 4 | C | Pci |
| 5 | D | Pdi |
| 6 | E | Pei |
| ⋮ | ⋮ | ⋮ |

1502

1512  1514  1516  1518

| Item# | Sensor ID | Location | Note |
|---|---|---|---|
| 1 | X | Px = (P1 + P2)/2 = Pxi | |
| 2 | Unknown | Pu | Anomaly Candidate |
| ⋮ | ⋮ | ⋮ | ⋮ |

| Com# | Timestamp at Gtwy | Timestamp | Sensor ID | Data (temp °F) |
|------|-------------------|-----------|-----------|----------------|
| 1    | 01:00:03          | 01:00:00  | X         | 61             |
|      |                   |           |           |                |
| ⋮    | ⋮                 | ⋮         | ⋮         | ⋮              |

| Seq. # | Timestamp | Sensor ID | Data:SS[dBm] , Freq., Duration | | |
|---|---|---|---|---|---|
| 1 | 01:00:01 | A | -40 | F1 | T1 |
| 2 | 01:00:01 | B | -50 | F1 | T1 |
| 3 | 01:00:01 | C | -30 | F1 | T1 |
| 4 | 01:00:02 | A | -45 | F2 | T1 |
| 5 | 01:00:02 | B | -25 | F2 | T1 |
| 6 | 01:00:02 | D | -55 | F2 | T1 |
| 7 | 01:00:03 | A | -45 | F3 | T1 |
| 8 | 01:00:03 | B | -25 | F3 | T1 |
| 9 | 01:00:03 | D | -55 | F3 | T1 |
| ⋮ | ⋮ | ⋮ | ⋮ | | |

| Item# | Sensor ID | Location |
|---|---|---|
| 1 | X | Pxi |
| 2 | A | Pai |
| 3 | B | Pbi |
| 4 | C | Pci |
| 5 | D | Pdi |
| 6 | E | Pei |
| ⋮ | ⋮ | ⋮ |

2002

| Item# | Sensor ID | Location | Note |
|---|---|---|---|
| 1 | X | Px = P1 = Pxi | |
| 2 | Unknown | Pu = P2 = P3 | Anomaly Candidate |
| ⋮ | ⋮ | ⋮ | ⋮ |

| Com# | Timestamp at Gtwy | Timestamp | Sensor ID | Data (temp °F) |
|---|---|---|---|---|
| 1 | 01:00:02 | 01:00:00 | X | 61 |
|  |  |  |  |  |
| ⋮ | ⋮ | ⋮ | ⋮ | ⋮ |

| Seq. # | Timestamp | Sensor ID | Data:SS[dBm], Freq., Duration | | |
|---|---|---|---|---|---|
| 1 | 01:00:01 | A | -40 | F1 | T1 |
| 2 | 01:00:01 | B | -50 | F1 | T1 |
| 3 | 01:00:01 | C | -30 | F1 | T1 |
| 4 | 01:00:01.90 | A | -45 | F2 | T1 |
| 5 | 01:00:01.90 | B | -25 | F2 | T1 |
| 6 | 01:00:01.90 | C | -55 | F2 | T1 |
| 7 | 01:00:02 | A | -50 | F3 | T1 |
| 8 | 01:00:02 | B | -30 | F3 | T1 |
| 9 | 01:00:02 | D | -55 | F3 | T1 |
| ⋮ | ⋮ | ⋮ | ⋮ | | |

| Item# | Timestamp | SS Data | Loc. | Dur. |
|---|---|---|---|---|
| 1 | 01:00:01 | A: -40, B: -50, C: -30 | P1 | T1 |
| 2 | 01:00:01.90 | A: -45, B: -25, C: -55 | P2 | T1 |
| 3 | 01:00:02 | A: -50, B: -30, D: -55 | P3 | T1 |
| ⋮ | ⋮ | ⋮ | ⋮ | ⋮ |

2402

| Item # | Timestamp | Location | Duration |
|---|---|---|---|
| 1 | 01:00:01 | P1 | T1 |
| 2 | 01:00:01.90 | P2 | T1 |
| 3 | 01:00:02 | P3 | T1 |
| ⋮ | ⋮ | ⋮ | ⋮ |

2404

| Item# | Series | Sensor ID | Location | Note |
|---|---|---|---|---|
| 1 | S1 | X | Px1 = P1 | |
| 2 | S1 | Unknown1 | Pu1 = P2 | Anomaly Candidate |
| 3 | S1 | Unknown2 | Pu2 = P3 | Anomaly Candidate |
| ⋮ | ⋮ | ⋮ | ⋮ | ⋮ |

2504 → Item#　2506 → Sensor ID　2508 → Location

| Item# | Sensor ID | Location |
|---|---|---|
| 1 | X | Pxi |
| 2 | Y | Pyi |
| 3 | A | Pai |
| 4 | B | Pbi |
| 5 | C | Pci |
| 6 | D | Pdi |
| 7 | E | Pei |
| ⋮ | ⋮ | ⋮ |

2502

2514 → Item#　2516 → Sensor ID　2518 → Location　2520 → Note

| Item# | Sensor ID | Location | Note |
|---|---|---|---|
| 1 | X | Px = P1 = Pxi | |
| 2 | Unknown | Pu = P2 | Anomaly Candidate |
| 3 | Y | Py = P3 = Pyi | Anomaly Candidate |
| ⋮ | ⋮ | ⋮ | ⋮ |

FIG. 25

WIRELESS SENSOR NETWORK SECURITY

BACKGROUND

A wireless sensor network system may be used for gathering many different types of information. Several examples of information that may be obtained by such systems may include temperature, humidity, pressure, and so forth. In some instances, the sensors may be widely deployed and may be configured to send the sensed data gathered by each sensor to a management computer. The management computer may organize and analyze the gathered sensor data, such as for determining a result. In some cases, the wireless network may be constructed and configured automatically, which may lead to the existence of one or more unknown sensors in the wireless network. Such unknown sensors may amount to wasted resources.

In addition, it is also possible that malicious or otherwise anomalous sensors may be included in the network, such as for snooping of network data, or the like. For example, a sensor may be planted in the network that is configured to transmit data outside the network. Additionally, or alternatively, it may be possible to hack or otherwise compromise a legitimate sensor to cause the sensor to send information outside of the network. In addition, sometimes sensors may not function properly, such as by sending unnecessary transmissions within the network. Further, even if an inventory is taken of the sensors in the network, such as based on communications received from the sensors, an anomalous sensor that merely eavesdrops on sensor data might not be detected.

SUMMARY

Some implementations include arrangements and techniques for detecting a sensor acting anomalously in a sensor network. As one example, a computing device may receive sensed data of a first sensor sent in a first transmission. The computing device may associate a first timestamp with the sensed data. Further, the computing device may receive, from other sensors, first signal strength information including first signal strength data and a first signal property related to the first transmission, and a second timestamp corresponding to detection of the first transmission. The computing device may receive, from other sensors, second signal strength information including second signal strength data and a second signal property related to a second transmission, and a third timestamp corresponding to detection of the second transmission. When the third timestamp is later than the first timestamp and the first signal property matches the second signal property, the computing device may indicate that a sensor that sent the second transmission is associated with an anomaly.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 12 illustrates an example data structure of received sensed data according to some implementations.

FIG. 13 illustrates an example data structure of received signal strength data according to some implementations.

FIG. 14 illustrates example data structures for determining anomalous sensors according to some implementations.

FIG. 15 illustrates example data structures for determining anomalous sensors according to some implementations.

FIG. 17 illustrates an example data structure of received sensed data according to some implementations.

FIG. 18 illustrates an example data structure of received signal strength data according to some implementations.

FIG. 20 illustrates example data structures for determining anomalous sensors according to some implementations.

FIG. 22 illustrates an example data structure of received sensed data according to some implementations.

FIG. 23 illustrates an example data structure of received signal strength data according to some implementations.

FIG. 24 illustrates example data structures for determining anomalous sensors according to some implementations.

FIG. 25 illustrates example data structures for determining anomalous sensors according to some implementations.

DETAILED DESCRIPTION

Figure 1:
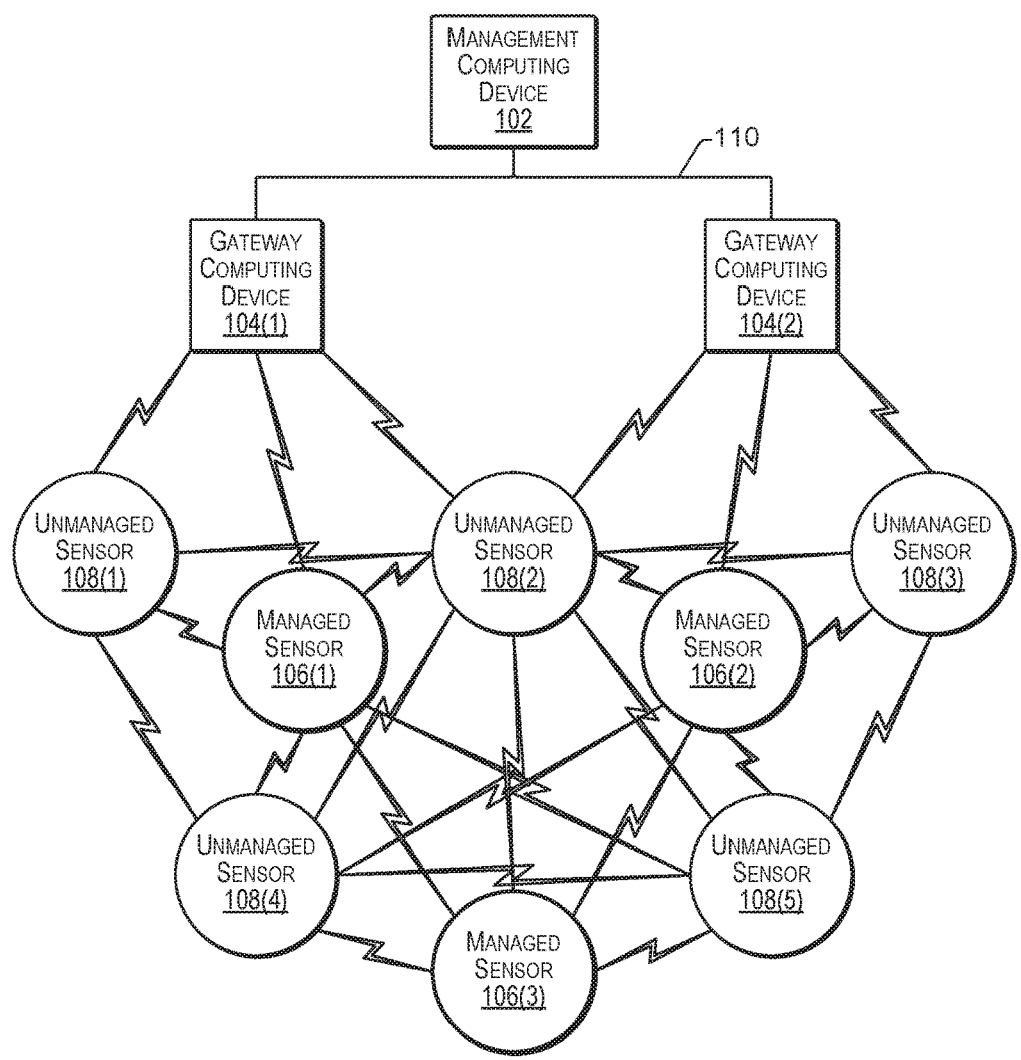
FIG. 1 illustrates an example architecture of a system including a plurality of sensors according to some implementations.

Some implementations herein are directed to techniques and arrangements for a wireless sensor network system that may use detected signal information to identify unknown or otherwise anomalous sensors in the system. The wireless sensor network system may include managed sensors having known locations that enable location information to be determined for other sensors in the system. In some examples, a gateway computing device may receive sensed data of a first sensor sent in a first transmission by the first sensor. The gateway computing device may associate a first timestamp with the sensed data. Further, the gateway computing device may receive, from the managed sensors, first signal strength information including first signal strength data and a first signal property related to the first transmission. The managed sensors may also include respective timestamps corresponding to detection of the first transmission. In addition, the gateway computing device may receive, from the managed sensors, additional signal strength information including signal strength data and signal properties related to one or more additional transmissions, such as transmissions made by a sensor to a target outside the sensor network. Additional timestamps added by the managed sensors may be included with the additional signal strength information.

The gateway computing device may use various techniques for detecting that a sensor is acting anomalously based on the signal strength information and associated timestamps received from the managed sensors. As one example, when the timestamp of the additional transmission is later than the first timestamp and the first signal property matches the signal property of the additional transmission, the computing device may indicate that a sensor that sent the additional transmission is associated with an anomaly.

Further, the gateway computing device may determine one or more locations associated with one or more additional transmissions, and compare the location(s) with a sensor inventory data structure to determine if the location(s) is associated with a known sensor in the data structure. As one example, when there are two additional transmission and the locations determined for the source of the additional transmission are determined to match (e.g., within a threshold distance to indicate that the same sensor sent both transmissions) then a sensor associated with at least one of the first location or the second location may be deemed to be anomalous. As still another example, when a first location associated with one of the additional transmissions is different from a second location associated with another additional transmission, and a first timestamp associated with a the first additional transmission is within a threshold time of the a second timestamp associated with the second additional transmission a sensor associated with at least one of the first location or the second location may be a candidate to be investigated for an anomaly. Accordingly, the implementations herein make it possible to determine the existence of unknown or otherwise anomalous sensors in the system without losing the usability of automatic operation and management of a widely deployed wireless sensor network system.

For discussion purposes, some example implementations are described in the environment of a network of wireless sensors able to communicate with each other, a gateway computing device, and a management computing device. However, implementations herein are not limited to the particular examples provided, and may be extended to other system configurations, other types of sensors, other types of computing devices, other types of environments, and so forth, as will be apparent to those of skill in the art in light of the disclosure herein.

FIG. 1 illustrates an example architecture of a system 100 according to some implementations. The system 100 includes a management computing device 102, one or more gateway computing devices 104(1) and 104(2), a plurality of managed sensors 106(1), 106(2), and 106(3), and a plurality of unmanaged sensors 108(1), 108(2), 108(3), 018(4), and 108(5). Further, while this example shows only several managed sensors 106 and unmanaged sensors 108 for the sake of clarity, in other examples, there may be a much larger number of at least the unmanaged sensors 108.

The managed sensors 106, unmanaged sensors 108, and gateway computing device 104 may communicate wirelessly, such as through any suitable wireless communication protocol. Alternatively, in other examples, the gateway computing device 104 may be connected for wired communication with at least the managed sensors 106. Examples of wireless protocols that may be used in some examples herein include Wi-Fi (IEEE 802.11), including WI-FI DIRECT®, BLUETOOTH®, cellular, or combinations thereof.

Furthermore, the gateway computing device 104 may be connected for communication with the management computing device 102 through one or more networks 110. The one or more networks 110 may include any type of network, including a local area network (LAN), such as an intranet; a wide area network (WAN), such as the Internet; a wireless network, such as a cellular network, a local wireless network, such as Wi-Fi, and/or short-range wireless communications, such as BLUETOOTH®; a wired network including fiber optics, Ethernet, Fibre Channel, or any other such network, or any combination thereof. Accordingly, the one or more networks 110 may include both wired and/or wireless communication technologies. Components used for such communications can depend at least in part upon the type of network, the environment selected, or both. Protocols for communicating over such networks are well known and will not be discussed herein in detail.

In some examples, each sensor 106 or 108 in the system 100 may include the ability to transmit, receive, and forward radio signals to and from other sensors 106 or 108 and/or the gateway computing device 104. Thus, in some instances, the system 100 may operate as a fully connected network topology so that at least two managed sensors 106 receive transmissions from each unmanaged sensor 108. In such an example, each sensor 106 and 108 may communicate with the gateway computing devices 104 and other sensors through a single hop. Additionally, or alternatively, the system 100 may operate as a mesh network and may pass information using a message sending algorithm, such as flooding or other algorithm that ensures that at least two managed sensors 106 receive a transmission by an unmanaged sensor 108 in a single hop, and the gateway computing device receives the transmission either in a single hop or through multiple hops. Other suitable network topologies will be apparent to those of skill in the art having the benefit of the disclosure herein.

As mentioned above, the managed sensors 106 may include the ability to determine the signal strength of a radio transmission from another sensor. Additionally, in some examples, the managed sensors 106 may be able to determine a direction from which a radio transmission is received. The location of at least some of the managed sensors 106 may be fixed so that the physical location of the managed sensors 106 is known to the gateway computing device 104. On the other hand, the unmanaged sensors 108 may be movable in some examples, and therefore the managed sensors may be used to determine the respective physical locations of the unmanaged sensors 108. Further, in some examples, the managed sensors 106 may detect that another managed sensor 106 has been moved based on detected signal strength of the other managed sensor.

As one example, the managed sensors may determine the signal strength of transmissions from other sensors based on a received signal strength indicator (RSSI). RSSI provides a technique for a measurement of the power present in a received radio signal. For instance, in an IEEE 802.11 system, RSSI may be the relative received signal strength in a wireless environment. Thus, RSSI may provide an indication of the power level received by the managed sensor, such that a higher RSSI number indicates a stronger signal from the unmanaged sensor. As an example, if the RSSI value is determined on a scale of 0 to 100, where 100 is the maximum RSSI value, the managed sensor may determine one of 101 different signal strength levels at any point in time. Further, RSSI may be used to determine when the radio signal strength is below a certain threshold at which point the managed sensor may determine that the unmanaged sensor is not sending a transmission. In some cases, there may not be a standardized relationship of any particular physical parameter to the RSSI reading. However, a vendor or chipset maker may provide its own accuracy, granularity, and range for the actual signal strength measured, e.g., as milliwatts (mW) or decibel milliwatts (dBm).

Further, while RSSI is described herein as one example of a technique for determining signal strength in some IEEE 802.11 implementations herein, other techniques such as received channel power indicator (RCPI) or the like, may be used alternatively, or in addition to, RSSI for IEEE 802.11 implementations, and still other techniques may be used in the case of BLUETOOTH® or other wireless protocols. Accordingly, implementations herein are not limited to a particular technique for determining signal strength.

Additionally, in some cases, when multiple gateway computing devices 104(1) and 104(2) are used, the gateway computing devices 104(1) and 104(2) may be able to communicate with each other over the one or more networks 110 or through a direct wired or wireless connection, such as for coordinating processing of signal strength information for determining location information of respective unmanaged sensors. For instance, if the first gateway computing device 104(1) receives, from the first managed sensor 106(1), signal strength information about the unmanaged sensor 108(2), and the second gateway computing device 104(2) receives, from the second managed sensor 106(2), signal strength information about the unmanaged sensor 108(2), the second gateway computing device may send the signal strength information received from the second managed sensor 106(2) to the first gateway computing device 104(1), and the first gateway computing device may determine the location of the unmanaged sensor 108(2).

Alternatively, in other examples, each of the gateway computing devices 104(1) and 104(2) may receive all communications issued by all managed sensors 106, and one of the gateway computing devices 104(1) or 104(2) may be configured to perform the location calculations. As another alternative, both of the gateway computing devices 104(1) and 104(2) may be configured to perform the location calculations. As still another alternative, the first gateway computing device 104(1) may be configured to perform the location calculations for one half of the unmanaged sensors and the second gateway computing device 104(2) may be configured to perform the location calculations for the other half of the unmanaged sensors, and so forth.

Figure 2:
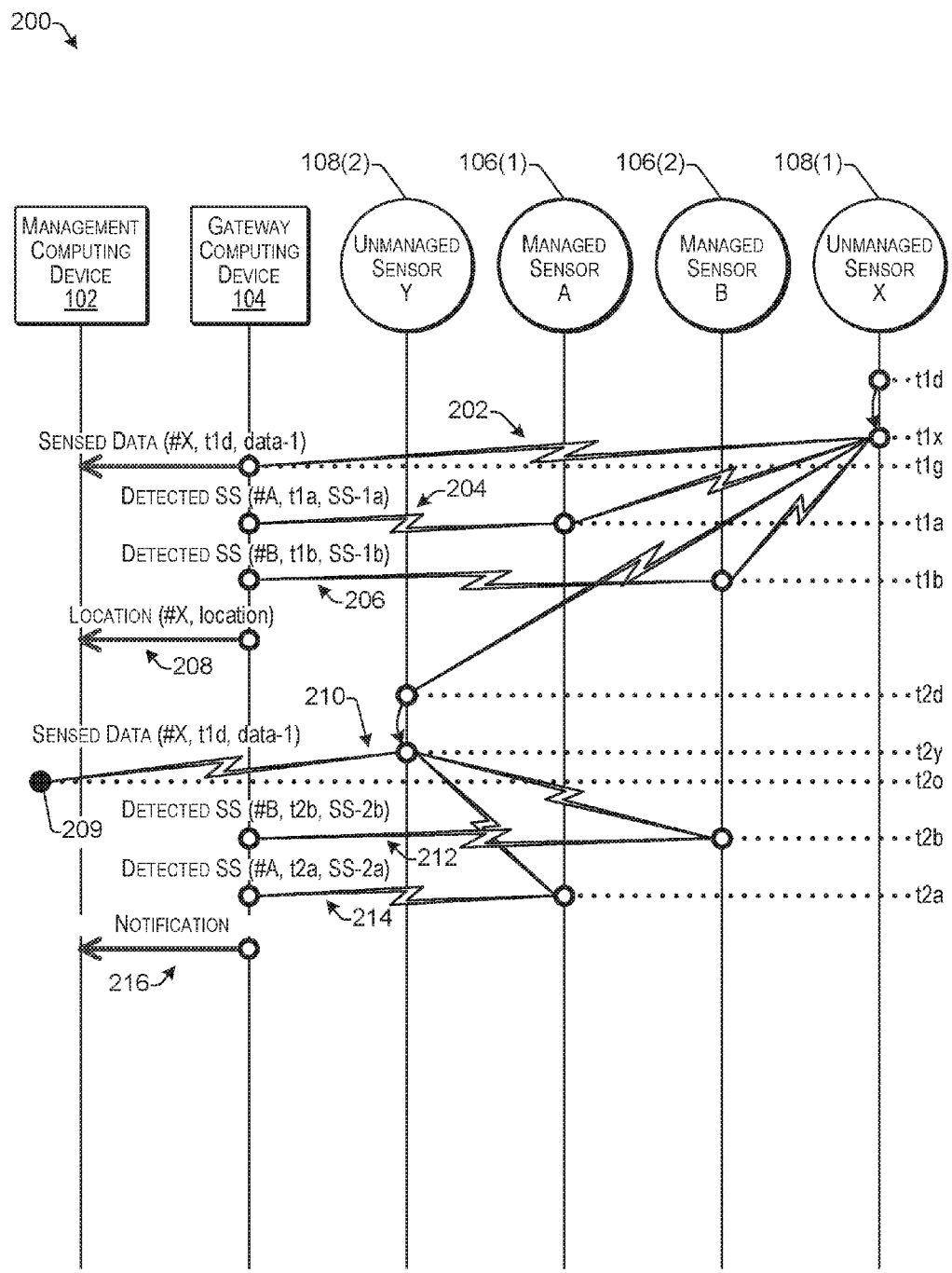
FIG. 2 illustrates an example sequence diagram according to some implementations.

FIG. 2 illustrates an example sequence diagram 200 according to some implementations. For instance, this example may correspond to a single hop wireless sensor network in that the sensors 106(1), 106(2), 108(1), and 108(2) are able to communicate directly with the gateway computing device 104; further, at least two managed sensors 106(1) and 106(2) are within range to receive radio communications from the unmanaged sensors 108(1) and 108(2).

In this example, suppose that the unmanaged sensor 108(2), having a sensor identifier (ID) "Y", has been planted, has been a compromised or hacked, or is otherwise an anomalous sensor that has been configured to eavesdrop on the sensor network and send intercepted data to a target outside the sensor network. Further, suppose that an unmanaged sensor 108(1) having a sensor ID "X" sends a first transmission 202 of sensed data information that may include sensed data, a timestamp associated with the sensed data, and the sensor ID. For instance, if the sensor 108(1) is a temperature sensor, the unmanaged sensor 108(1) may send the transmission 202 that includes an indication of the detected temperature (e.g., temperature detected just prior to sending, average temperature detected over a period of time prior to sending, or the like), indicated as "data-1" in this example. Further, the transmission may include a timestamp of when the temperature measurement is taken (or completed being taken), i.e., "t1d", and the sensor ID, i.e., "X" in this example. In some cases, the sensor ID may be an assigned ID, such as an ID that is unique or otherwise individually distinguishable within the system 100. Additionally, or alternatively, a respective IP address associated with each sensor may be used as the sensor ID. Further, suppose that the unmanaged sensor 108(1) sends the transmission 202 at time t1x.

The gateway computing device 104 may receive the transmission 202 from the unmanaged sensor 108(1), and may forward the sensed data information included in the transmission 202 to the management computing device 102. In addition, the gateway computing device 104 may record its own timestamp of the time "t1g" at which the gateway computing device 104 received the transmission 202 from the unmanaged sensor 108(1).

Some of the managed sensors 106 that are located near the unmanaged sensor 108(1) may also detect the radio signal of the transmission 202. Thus, in addition to the gateway computing device 104 receiving the communication 202, one or more managed sensors 106 may also receive the transmission 202 and/or may otherwise detect the signal strength of the transmission 202. For instance, the first managed sensor 106(1) may have a sensor ID "A" in this example, and may detect the signal strength of the transmission at a time "t1a". Further, the second managed sensor 106(2) may have a sensor ID "B", and may detect the signal strength of the transmission 202 at a time "t1b".

In this example, the first managed sensor 106(1) and the second managed sensor 106(2) may each send signal strength information to the gateway computing device 104, along with respective timestamps of when the signal strength was detected, and respective sensor IDs of the respective managed sensors 106(1) and 106(2). Thus, the first managed sensor 106(1) may send a communication 204 that includes the sensor ID "A", the timestamp "t1a" of when the first managed sensor 106(1) detected the signal strength of the transmission 202, and the signal strength information "SS-1a". Similarly, the second managed sensor 106(2) may send a communication 206 that includes the sensor ID "B", the timestamp "t1b" of when the second managed sensor 106(2) detected the signal strength of the transmission 202, and the signal strength information "SS-1b". Additionally, the signal strength information may include several other signal properties, as discussed additionally below with respect to, e.g., FIG. 3.

In some cases, the respective timestamps t1a and t2a measured on the managed sensors 106(1) and 106(2), respectively, may include single timestamps of when the signal strength is detected. Alternatively, in some cases, the respective timestamps t1a and t2a measured on managed sensors 106(1) and 106(2), respectively, may include timestamps of the beginning and the ending of the signal detection, as discussed additionally below, e.g., with respect to FIG. 6, to indicate a length of the transmission in units of time.

The gateway computing device 104 may receive the communications 204 and/or 206 from the managed sensors 106(1) and 106(2), respectively, and may associate the received sensed data, data-1, with the detected signal strength(s) (detected SS) based at least in part on comparing the timestamp t1g recorded at the gateway computing device 104 with the timestamps t1a and/or t1b recorded at the management sensors 106(1) and 106(2), respectively. For example, if t1g, t1a, and t1b are approximately the same time (e.g., within a threshold time), then the detected SS information received from the managed sensors 106(1) and 106(2) may be associated with the sensed data received by the gateway computing device 104 from the unmanaged sensor 108(1) based on a high likelihood that they correspond to the same radio signal.

As discussed additionally below, the gateway computing device 104 may determine the location of the unmanaged sensor 108(1) based on the received detected signal strength information. The gateway computing device 104 may send the location information to the management computing device 102 in a transmission 208 for use in determining an analysis result based at least in part on the sensed data. Alternatively, the gateway computing device 104 may forward the detected SS information from communications 204 and 206 to the management computing device 102, and the management computing device 102 may perform the processing to determine the location of the unmanaged sensor 108(1).

Furthermore, suppose that the anomaly unmanaged sensor 108(2) also receives the transmission 202 from the first unmanaged sensor 108(1) at time t2d. Additionally, suppose that the second unmanaged sensor 108(2) sends the sensed data information in the received transmission to a target 209 outside the sensor network by sending a transmission 210 at a time t2y. Thus, the external target 209 may receive the transmission 210 at time t2o. In addition, one or more of the managed sensors 106(1) and 106(2) may also receive the transmission 210 and/or may otherwise detect the signal strength of the transmission 210. For instance, the first managed sensor 106(1) may detect the signal strength of the transmission 210 at a time "t2a". Further, the second managed sensor 106(2) may detect the signal strength of the transmission 210 at a time "t2b".

In this example, the first managed sensor 106(1) and the second managed sensor 106(2) may each send signal strength information to the gateway computing device 104, along with respective timestamps of when the signal strength was detected, and respective sensor IDs of the respective managed sensors 106(1) and 106(2). Thus, the second managed sensor 106(2) may send a communication 212 that includes the sensor ID "B", the timestamp "t2b" of when the second managed sensor 106(2) detected the signal strength of the transmission 210, and the signal strength information "SS-2b". Similarly, the first managed sensor 106(1) may send a communication 214 that includes the sensor ID "A", the timestamp "t2a" of when the first managed sensor 106(1) detected the signal strength of the transmission 210, and the signal strength information "SS-2a". As discussed additionally below, the gateway computing device 104 may determine the location of the anomaly unmanaged sensor 108(2) based on the received detected signal strength information SS-2a and SS-2b.

In some examples, the gateway computing device may determine that there is not a known sensor associated with the location indicated by the detected signal strength(s) (detected SS) provided in the transmissions 212 and 214. Alternatively, if the unmanaged sensor 108(2) is known in the network, but has been hacked, then as discussed below, the gateway computing device 104 may determine that the unmanaged sensor is retransmitting sensed data received from other sensors. In some examples, the gateway computing device 104 may receive the transmission 210 also, and may determine that the unmanaged sensor 108(2) is retransmitting sensed data information already received by the gateway computing device 104.

The gateway computing device 104 may send a notification 216 or other communication to the management computing device 102 to provide a warning or other indication of a malicious, malfunctioning, or otherwise anomalous sensor. In some cases, the notification may include location information indicating the physical location of the anomalous sensor 108(2). Alternatively, the gateway computing device 104 may forward the detected SS information from communications 212 and 214 to the management computing device 102, and the management computing device 102 may perform the processing to determine the location of the second unmanaged sensor 108(2) and/or that the unmanaged sensor 108(2) appears to be acting anomalously.

Figure 3:
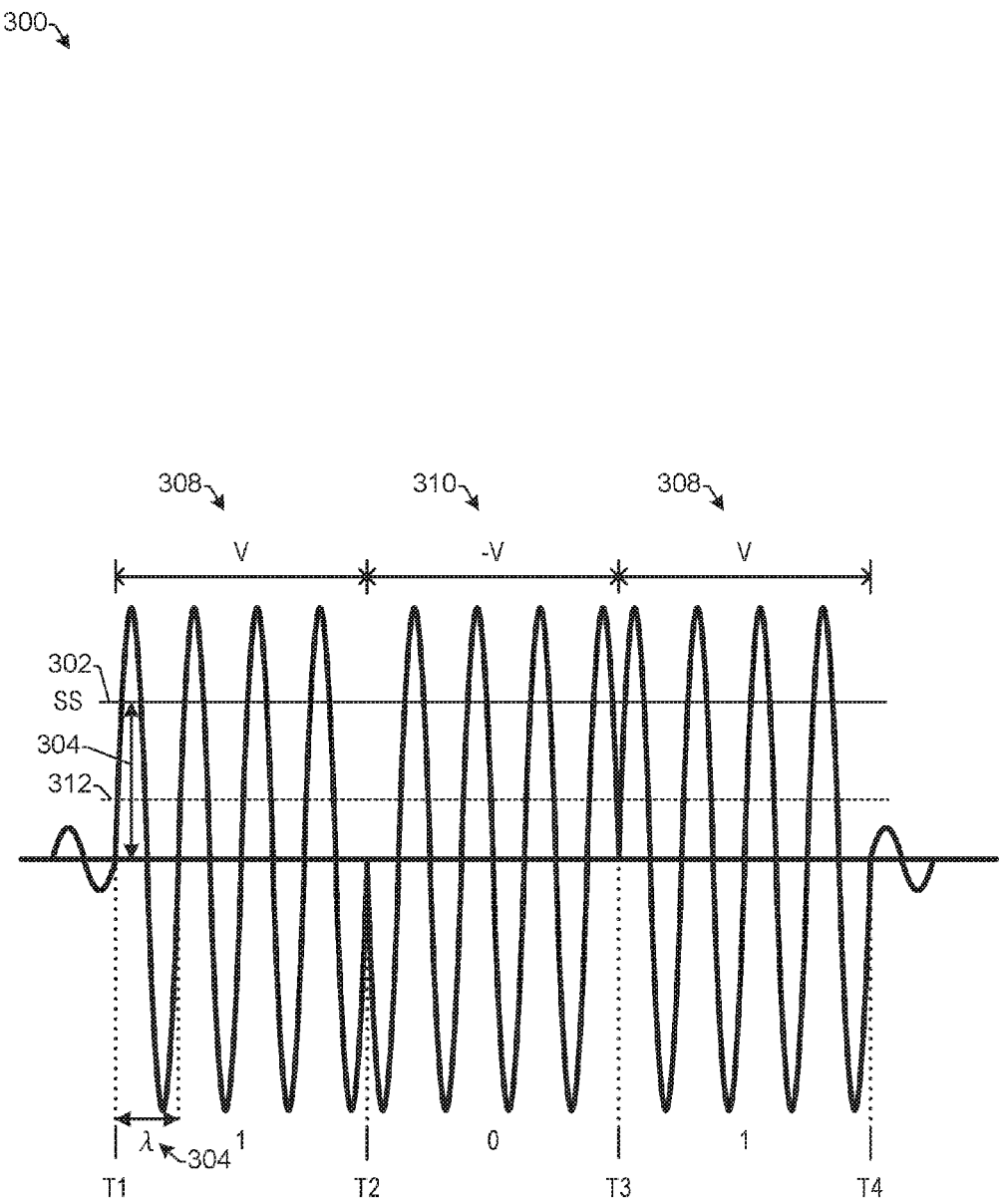
FIG. 3 illustrates an example of signal properties according to some implementations.

FIG. 3 illustrates an example diagram of signal properties of a signal 300 according to some implementations. For instance, the detected signal strength of the signal 300 may be a measurement of the power present in a received radio signal. In the diagram of FIG. 3, the signal strength SS 302 is illustrated as the mean (average) of the signal strength having a value 304. For instance, as indicated at 306, the signal 300 may have a frequency lambda ($\lambda$) and the signal during a given frequency may be recognized as a numeric value of a digital signal such as 1 and 0 by the difference of the phase shown as V and −V, as indicated at 308 and 310, respectively. In some examples, a beginning time T1 is determined when the signal strength SS is more than a threshold 312 and an ending time T4 may be determined when signal strength SS is less than a threshold, such as the threshold 312 or some other threshold. Accordingly, the length of time of the transmission may be determined based on the difference between T4 and T1. The modulation that is a pattern of the digital signal 300 may be used to recognize the type of data transmission protocol such as wireless LAN, LTE (long-term evolution), or the like. In some examples, signal properties, such as length of transmission, type of transmission, frequency, and the like may be used for associating sensed data information with signal strength information in addition to, or as an alternative to, the timestamps herein.

FIGS. 4-8 include flow diagrams illustrating example processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks and systems described in the examples herein, although the processes may be implemented in a wide variety of other environments, frameworks and systems.

Figure 4:
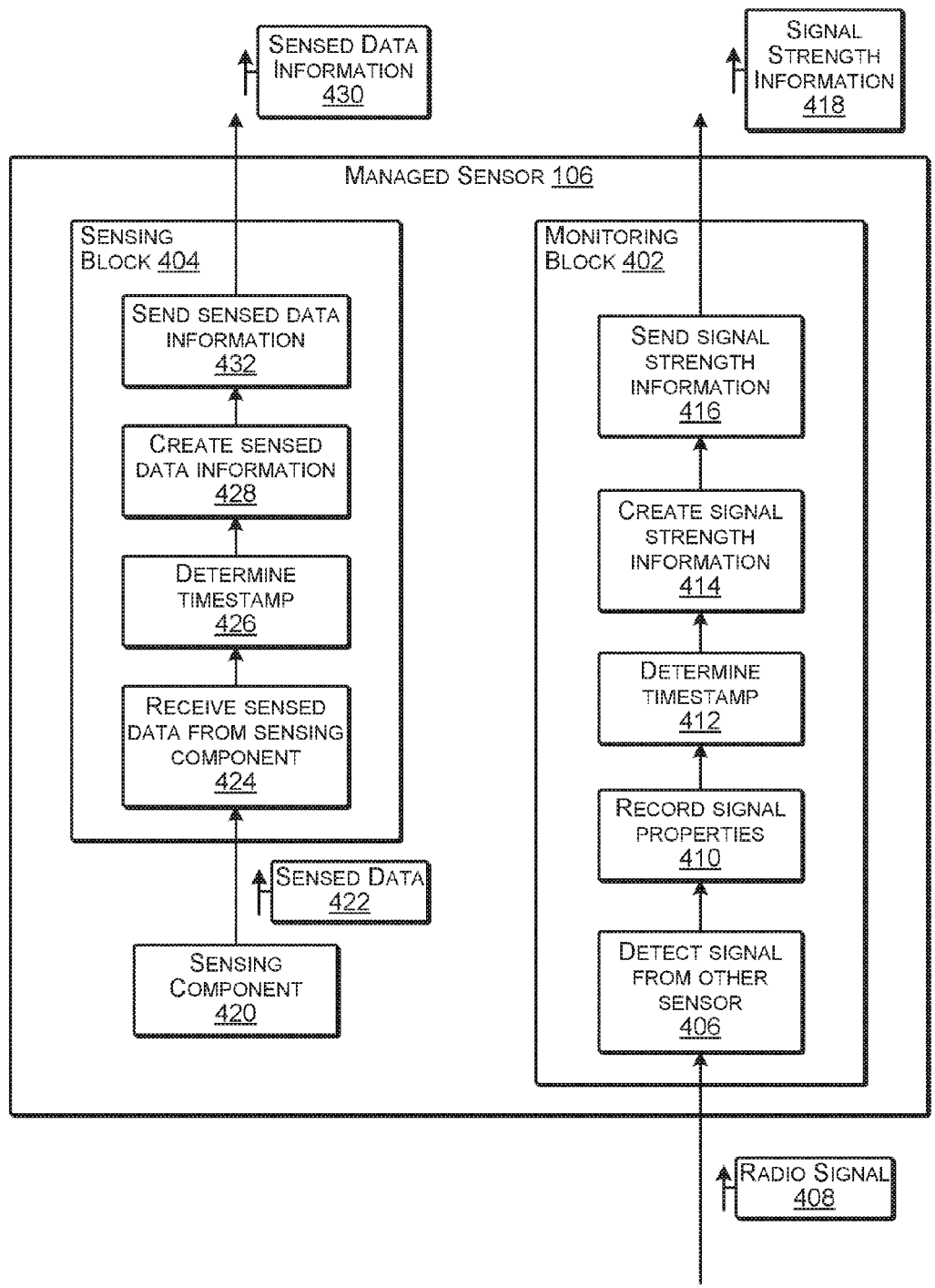
FIG. 4 illustrates an example logical block diagram of a managed sensor according to some implementations.

FIG. 4 illustrates an example logical block diagram of a managed sensor 106 according to some implementations. The managed sensor 106 in this example includes a monitoring block 402 and a sensing block 404, each of which may correspond to an algorithm including a plurality of operations. The monitoring block 402 is configured to monitor radio signals around the managed sensor 106 and send information about the monitored signals to, e.g., the gateway computing device. Accordingly, as indicated at 406, the managed sensor 106 may be configured to detect or otherwise receive a radio signal 408, such as from another sensor (not shown in FIG. 4).

At 410, the managed sensor may record the signal properties of the detected signal. For example, as discussed above, the managed sensor may determine the mean signal strength of the detected radio signal 408.

At 412, the managed sensor determines a timestamp to apply to the detected signal 408. For example, the managed sensor may include a clock or the like to enable the managed sensor to determine and apply a timestamp when the signal 408 is detected.

At 414, the managed sensor may create signal strength information to be sent to the gateway computing device. For instance, the managed sensor may packetize or otherwise prepare to send the signal strength information including the signal strength data, the timestamp, and the ID of the managed sensor. In some examples, the signal strength data may include signal properties, such as a length of the signal in units of time, a frequency, modulation, or the like.

At 416, the managed sensor may send the signal strength information 418. For example, the signal strength information 418 may be sent to the gateway computing device and/or to other sensors or other nodes in the system.

The sensing block 404 configures the managed sensor 106 for sensing and transmitting measurements or other information provided by a sensing component 420, such as temperature, pressure, sound, light, motion, images, or other sensed data 422.

At 424, the managed sensor obtains or otherwise receives the sensed data 422 from the sensing component 420.

At 426, the managed sensor determines a timestamp to be applied to the sensed data 422. For example, managed sensor may include a clock to enable the managed sensor to determine and apply a timestamp to the sensed data 422 received from the sensing component 420.

At 428, the managed sensor may create sensed data information 430 such as by packetizing or otherwise preparing for transmission the sensed data 422, the data timestamp, and the ID of the managed sensor.

At 432, the managed sensor may transmit or otherwise send the sensed data information 430. For example, the sensed data information 432 may be sent to the gateway computing device and/or to another sensor or other node in the system. In some examples, the gateway may be configured to receive the sensed data information 430, and forward the sensed data information 430 to the management computing device.

In some examples, if the managed sensor 106 is used only for detecting radio signals of the unmanaged the sensors 108, then the sensing block 404 may be omitted from the managed sensor 106. Furthermore, the unmanaged sensors 108 herein may include the sensing block 404, but may not include the monitoring block 402. Alternatively, in some examples, all the sensors in the system may be managed sensors 106 that include both the sensing block 404 and the monitoring block 402.

Figure 5:
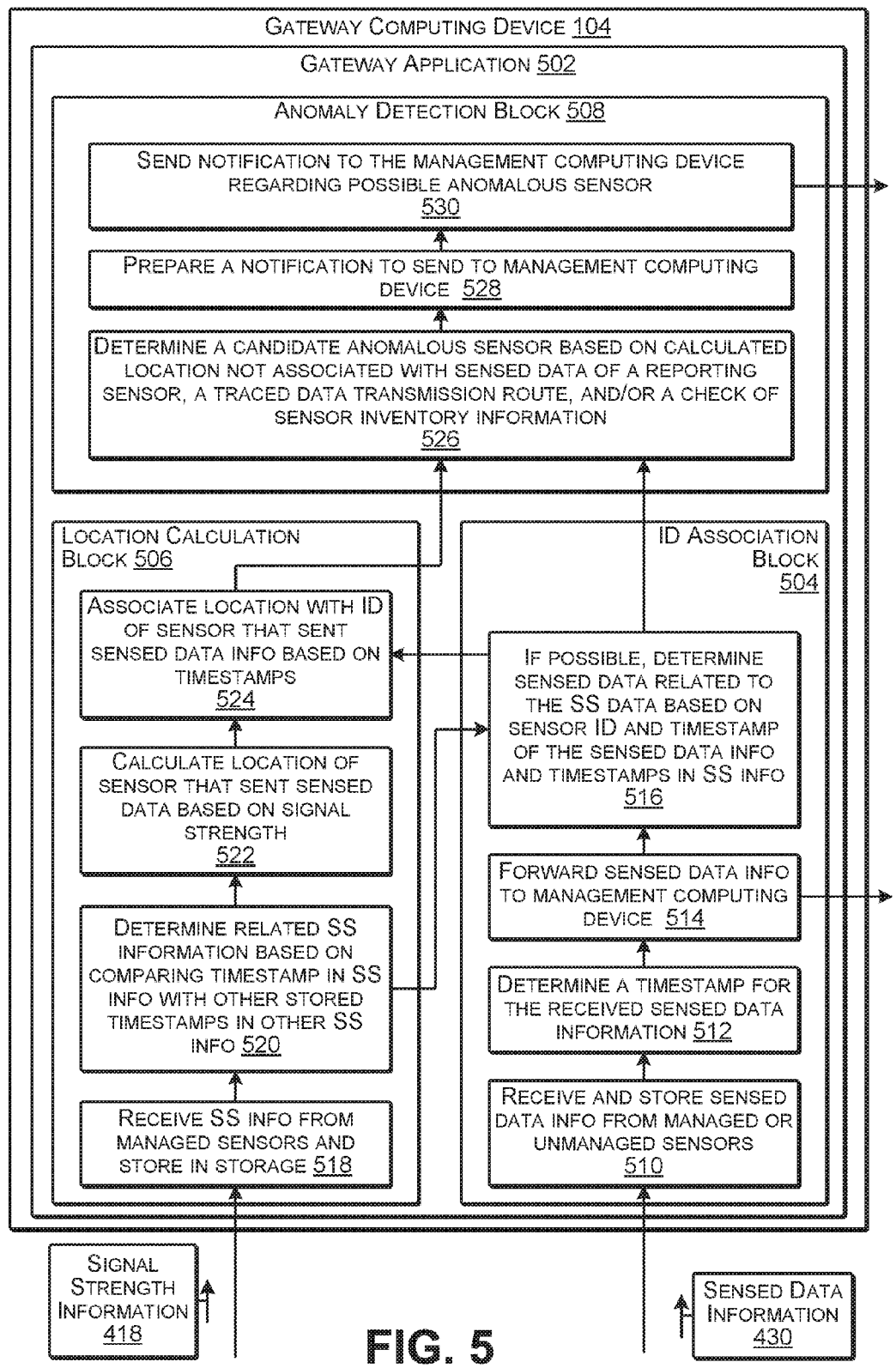
FIG. 5 illustrates an example logical block diagram of a gateway computing device according to some implementations.

FIG. 5 illustrates an example logical block diagram of a gateway computing device 104 according to some implementations. In this example, the gateway computing device 104 includes a gateway application 502 that includes a location calculation block 504, and ID association block 506, and an anomaly detection block 508.

At 510, the gateway computing device may receive and store the sensed data information 430 sent from a managed sensor or an unmanaged sensor.

At 512, the gateway computing device may determine a timestamp for the received sensed data information.

At 514, the gateway computing device may forward the received sensed data information to the management computing device.

At 516, the gateway computing device may determine if there is any received sensed data information 430 that corresponds to the signal strength information based on comparing timestamps. For example, the gateway timestamp associated with the received sensed data information may be compared with timestamps included in received signal strength information to determine timestamps within a threshold time of each other. For instance, based on the system and the frequency of sensor reporting, the time threshold may depend at least partially, on how closely the clocks of the sensors are synchronized with the gateway clock. By determining associated timestamps, the gateway computing device is able to associate the sensor ID of the sensor that sent the sensed data information 430 with signal strength information that can be used to determine the location of the sensor that sent the sensed data information 430.

At 518, in the location calculation block, the gateway computing device may receive and store signal strength information 418 from the managed sensors. In some cases, the gateway computing device may receive signal strength information 418 from two or more managed sensors for each transmission of sensed data (or other transmissions) by an unmanaged sensor or managed sensor.

At 520, the gateway computing device may determine related SS information based on comparing timestamp information with other stored timestamps of other received signal strength information to determine timestamps within a threshold time of each other. By determining timestamps within a threshold time of each other, the gateway computing device is able to determine signal strength information received from multiple managed sensors related to the same transmission of sensed data from a particular sensor. Thus, in some examples, there may be three or more timestamps within the threshold time of each other, i.e., a timestamp of the gateway computing device for receipt of the sensed data information, a timestamp of a first managed sensor indicating detection of the signal strength of the transmission of the sensed data information; and a timestamp of a second management sensor indicating the detection of the signal strength of the transmission of the sensed data information.

At 522, the gateway computing device may calculate the location of the sensor that sent the sensed data information 430 based on the signal strength information 418 received from the managed sensors.

At 524, the gateway computing device may associate the calculated location information with the ID of the sensor that sent the sensed data information 430. The location calculation block may forward the location and the sensor ID to the anomaly detection block 508.

At 526, in the location management block, the gateway computing device may determine a candidate anomalous sensor based on a calculated location not being associated with sensed data of a reporting sensor, and/or a traced data transmission route, and/or a check of sensor inventory information. For example, the gateway computing device may use several techniques to detect the presence of an anomalous sensor. The sensor may be indicated to be a candidate anomalous sensor that might be indicated to be a candidate for investigation by a human. Any desired technique may be used for indicating a sensor to be a candidate anomalous sensor, such as making a note in a data structure, placing a flag, changing an associated bit from a "1" to a "0", sending a notification to a management computing device, to an administrator or other user, or the like.

At 528, the gateway computing device may prepare a notification to send to the management computing device based on detection of an anomalous sensor at 526.

At 530, the gateway computing may send the notification to the management computing device. In some cases, the notification may include an indicated physical location of the anomalous sensor. Alternatively, in some examples, one or more of the ID association block 504, location calculation block 506, or anomaly detection block 508 may be executed on the management computing device. Other variations will be apparent to those of skill in the art having the benefit of the disclosure herein.

Figure 6:
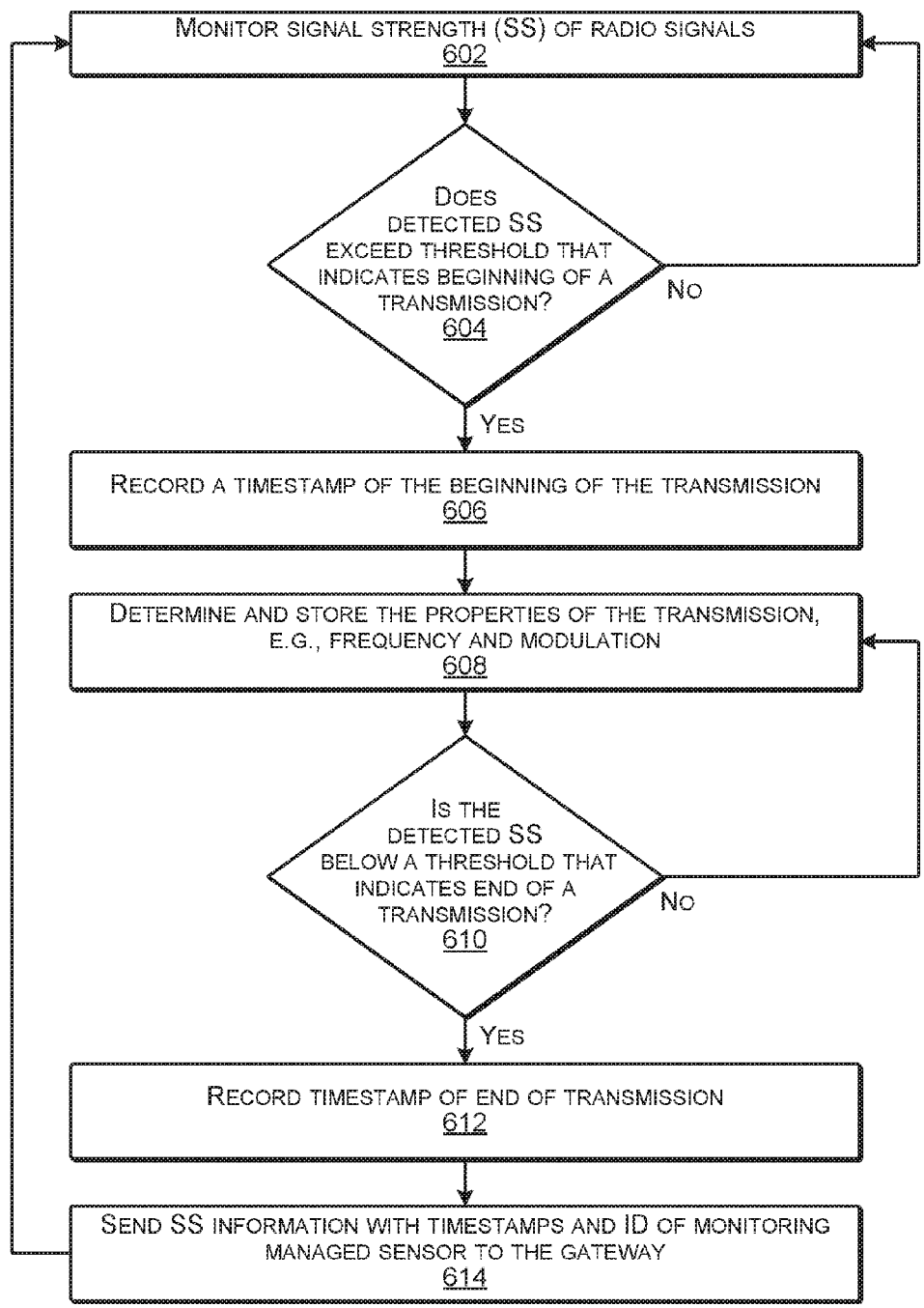
FIG. 6 is a flow diagram illustrating an example process for signal monitoring according to some implementations.

FIG. 6 is a flow diagram illustrating an example process 600 for signal monitoring according to some implementations. In some examples, the process 600 may be executed by a managed sensor or other suitable computing device for monitoring signal strengths of transmissions by other sensors in the sensor network. For instance, radio signals from unmanaged sensors may be monitored to check whether the signal strength is more than a threshold amount that indicates the beginning of transmission of sensed data. If the signal strength is more than the threshold level, then the managed sensor may record a timestamp corresponding to the beginning of the transmission. Further, the managed sensor may monitor and record the properties of the radio signal, such as frequency and modulation. When the signal strength becomes less than the threshold that indicates the end of the transmission, and in some cases, the managed sensor may record timestamp of the ending of the transmission. The managed sensor may send the signal strength information to the gateway computing device. In some examples, the process 600 may be executed by the monitoring block 402 of FIG. 4.

At 602, the managed sensor may monitor the signal strength (SS) of radio signals from other sensors in the sensor network.

At 604, the managed sensor may determine whether the detected signal strength exceeds a threshold that indicates the beginning of a transmission. If not, the process returns to 602 to continue monitoring; if so, the process goes to block 606.

At 606, when the beginning of a transmission is detected, the managed sensor may record a timestamp for the beginning of the transmission.

At 608, the managed sensor may determine and store the properties of the transmission, e.g., frequency and modulation.

At 610, the managed sensor may determine whether the detected signal strength has fallen below a threshold that indicates the end of the transmission. If not, the process returns to 608 to continue determining and storing the properties of the transmission; if so, the process goes to 612.

At 612, the managed sensor may record a timestamp corresponding to the end of the transmission. In some examples, the first timestamp and the second timestamp may be used to determine the length of the transmission in units of time.

At 614, the managed sensor may send the signal strength information to the gateway computing device and/or to another node in the system. For instance, the signal strength information may include the radio signal properties of the transmission with a timestamp of the beginning and a timestamp of the ending, and ID of the managed sensor that performed the monitoring and is sending the signal strength information.

Figure 7:
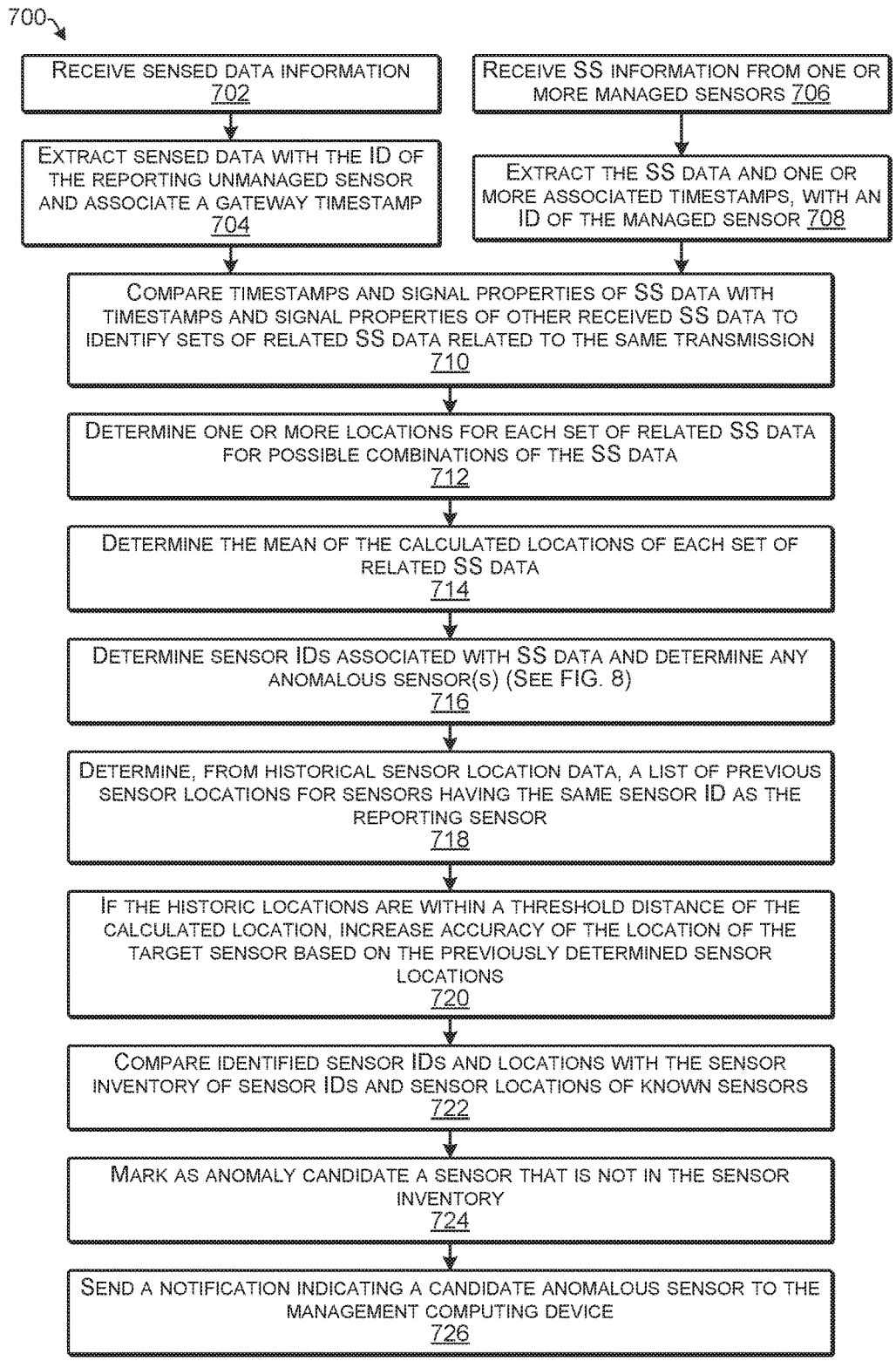
FIG. 7 is a flow diagram illustrating an example process for determining sensor locations according to some implementations.

FIG. 7 is a flow diagram illustrating an example process 700 for determining sensor locations according to some implementations. In some examples, the process 700 may be executed by gateway application 502 on the gateway computing device 104 or other suitable computing device for detection of candidate anomalous sensors. As discussed above, the signal strength information may include one or more timestamps and the ID of the managed sensor that detected the signal strength. Further, sensed data information may be received with a sensor ID, and the computing device may generate a timestamp for the received sensed data. The gateway timestamp given to the sensed data may be used to associate the received sensed data with the received signal strength information based on associated timestamps. The location of the identified reporting sensor may be calculated using a geometric method, such as triangulation, trilateration, or the like. In some examples, the location of identified sensor may be calculated as mean (average) of several locations calculated with a subset of the signal strength data (e.g., a combination of related SS data) with same timestamps and properties of signal. The ID of the sensor may be associated with the location based on the same timestamp recorded at the gateway as timestamps recorded at the managed sensors. An anomalous sensor may be detected based on the process 800 discussed below with respect to FIG. 8. Further, in some examples, historical data of locations previously calculated for the same sensor ID may be determined and used during recalculation of the location of the identified sensor, e.g., based on a mean, or the like. Additionally, a sensor inventory may be checked to determine whether the location and sensor ID determined from the SS data and the sensed data matches with the information in the inventory. If there is not a match, the sensor corresponding to the sensor ID may be marked as a candidate anomalous sensor. If any candidate anomalous sensors are detected, a notification may be sent to the management computing device.

At 702, the computing device may receive sensed data information sent by a reporting unmanaged sensor. For example, the sensed data information may include the sensed data, a sensor ID of the reporting sensor that sent the sensed data and a timestamp corresponding to when the data was sensed by the reporting sensor. Further, in some examples, such as in the case that a managed sensor is movable, the process 700 may also be applied to a managed sensor as the reporting sensor.

At 704, the computing device may extract the sensed data with the sensor ID of the reporting sensor, the timestamp at which the data was sensed, and may further associate a gateway timestamp with the sensed data.

At 706, the computing device may receive signal strength (SS) information from one or more managed sensors. Further, in some examples, the gateway computing device may also be able to determine signal strength information.

At 708, the computing device may extract, from the signal strength information, the signal strength data, one or more associated timestamps, and an ID of the managed sensor that sent the signal strength information.

At 710, the computing device may compare a timestamp and/or signal properties of the SS data with the time stamps and/or signal properties of other received SS data to determine one or more sets of related SS data. For instance, the SS data in a set of related SS data may have timestamps within a threshold time of each other or may have matching measured signal properties, such as same length of transmission, same frequency, same modulation, etc. Accordingly, the set of related SS data may be assumed to correspond to the same sensed data transmission and therefore at least some of the SS data in the set may be assumed to be indicative of the location of the reporting sensor.

At 712, the computing device may determine one or more locations from the set of related SS data based on possible combinations of the received SS information. For example, if signal strength information is received from three or more managed sensors, then techniques discussed below such as triangulation, trilateration, or the like, may be used to determine, from multiple different combinations of the signal strength information, a plurality of indicated locations of the reporting sensor.

At 714, the computing device may determine the mean of the calculated locations of each set of related SS data. For example, when multiple locations that are close to each other, but different, are determined from the multiple different combinations of signal strength information, the computing device may determine the mean of the multiple locations as the determined location of the associated sensor.

Figure 8:
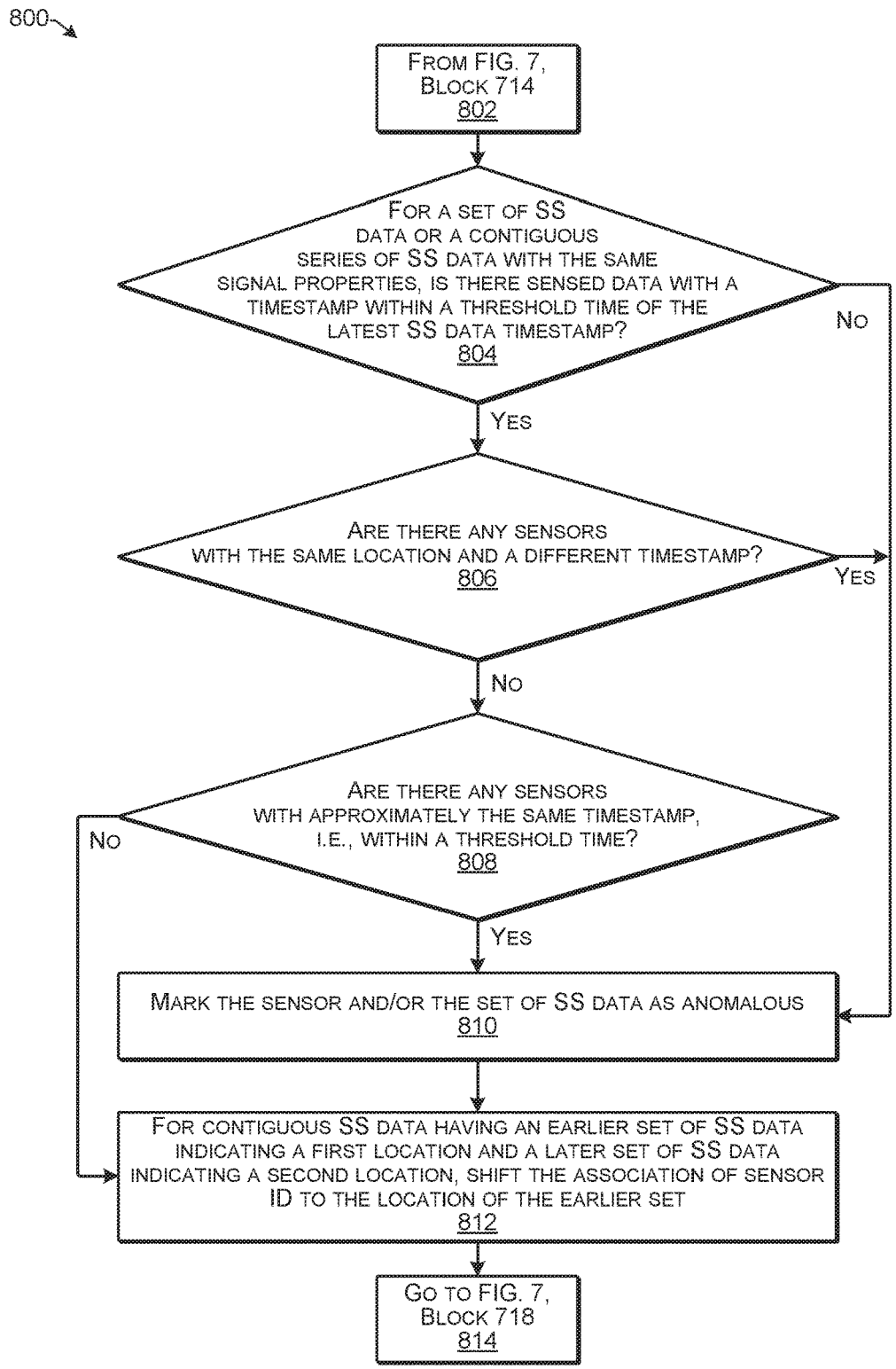
FIG. 8 is a flow diagram illustrating an example process for determining anomalous sensors according to some implementations.

At 716, the computing device may determine sensor IDs associated with SS data and may determine any anomalous sensors. FIG. 8 sets forth an example process that includes determining anomalous sensors. Further, to determine reporting sensor IDs associated with the SS data, the computing device may compare timestamps of SS data with the gateway timestamp of the received sensed data to associate the sensor ID with respective SS data having the same timestamp, e.g., within the threshold time of each other. Alternatively, in some examples, rather than relying on comparison of the timestamps, signal properties of the sensed data transmission may be compared. Thus, the gateway computing device may be able to determine the association of the signal strength information with the sensed data and the reporting sensor ID through other techniques in addition to or as an alternative to comparison of timestamps.

At 718, following the process 800 of FIG. 8, the computing device may determine, from historical sensor location data, a list of previous sensor locations for sensors having the same sensor ID as the reporting sensor.

At 720, if the historic locations are within a threshold distance of the calculated location, the computing device may increase accuracy of the location of the reporting sensor based on the previously determined sensor locations. For example, if the historic locations for the reporting sensor are within the threshold distance (e.g., within a threshold tolerance based on the actual distances between sensors in the network), then the reporting sensor may be assumed to have not been moved from the previously determined locations. Accordingly, the current calculated location may be averaged with the previously determined locations to determine a new current location of the reporting sensor. On the other hand, if the historic locations are not within the threshold distance of the current calculated location, then the reporting sensor may be assumed to have been moved from the previous location and the historic locations of the reporting sensor might not be used to improve the accuracy of the current calculated location.

At 722, the computing device may compare an identified sensor ID and location with a sensor inventory of sensor IDs and sensor locations of known sensors in the sensor network.

At 724, the computing device may mark as a candidate anomalous sensor a sensor having a location or sensor ID that is not in the sensor inventory.

At 726, the computing device may send a notification indicating a candidate anomalous sensor to management computing device.

FIG. 8 is a flow diagram illustrating an example process 800 that includes determining anomalous sensors according to some implementations. In some examples, the process 800 may be executed by the gateway application 502 on the gateway computing device 104 or other suitable computing device for detection of candidate anomalous sensors. The sets of related SS data may be checked to determine whether there exists sensed data with the same timestamp as that of the latest SS data in a set to determine whether the last data transmission reached the gateway computing device. If the last data transmission did not reach the gateway computing device, the corresponding sensor (or indicated sensor location) may be marked as a candidate anomalous sensor. If the last data transmission did reach the gateway, a check may be performed as to whether any sensors with the same position and a different timestamp exist, such as whether the sensor transmitted data only to the next hop. If a different transmission exists, the associated sensor may be marked as a candidate anomalous sensor. If the different transmission does not exist, a check may be performed as to whether any sensors associated with approximately the same timestamp exist, which may indicate that the data transmitted from a previous hop was received by multiple sensors and transmitted to multiple destinations. If multiple data transmissions are found, an associated sensor may be marked as a candidate anomalous sensor. If multiple data transmissions are not found, the sensor ID from the sensed data may be associated with a first set of contiguous SS data, rather than a second set, if such exists.

At 802, the computing device may continue processing from block 714 of FIG. 7.

At 804, for a set of SS data or for a contiguous series of SS data with the same signal properties, the computing device may determine whether there is sensed data with a timestamp within threshold time of the latest SS data timestamp. If so, the process goes to block 806; if not, the process goes to block 810 to mark the associated sensor (or sensor location) as anomalous.

At 806, the computing device may determine whether there are any sensors with the same location and a different timestamp. If so, the process goes to block 810 and the sensors may be marked as anomalous; if not, the process may go to block 808.

At 808, the computing device may determine whether there any sensors with approximately the same timestamp, i.e., within a threshold time. If so, the process goes to block 810 and the sensors may be marked as anomalous; if not, the process may go to block 812.

At 810, the computing device may mark or otherwise indicate the sensor(s) to be anomalous. For instance, the computing device may include a data structure (not shown in FIG. 8) with information about sensors and or sensor locations that are determined to be anomalous.

At 812, for contiguous SS data having an earlier set of SS data indicating a first location and a later set of SS data indicating a second location, the computing device may shift the association of sensor ID to being associated with the location indicated by the earlier set of related SS data.

At 814, the process may return to the block 718 of FIG. 7 to continue processing.

Figure 9:
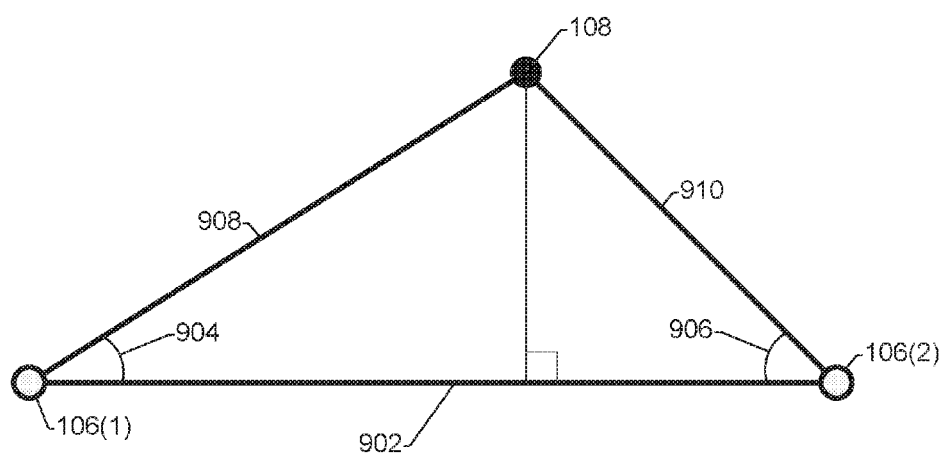
FIG. 9 illustrates an example of triangulation according to some implementations.

FIG. 9 illustrates an example 900 of triangulation according to some implementations. For example, triangulation may employ distances and angles from two points whose locations are known for determining the location of a third point. Additionally, as one example, RSSI information may scale linearly with the logarithm of distance and thus it is possible to determine the distance of a reporting sensor by measuring the strength of the reporting sensor radio signal. Further, the direction from which a signal is received may also be determined in some implementations based on the antenna configuration of the managed sensors and/or based on other radio direction finding capability built in to the managed sensors.

In the illustrated example, suppose a first managed sensor 106(1) and a second managed sensor 106(2) are in fixed positions and therefore are in known locations and are a known distance 902 from each other. Furthermore, based on signal strength information that includes directional information received by the first managed sensor 106(1) and the second managed sensor 106(2) with respect to the radio signal from an unmanaged sensor 108, it is possible to determine a first angle 904 and a second angle 906, as well as a first distance 908, and a second distance 910. Since not all of this information is needed to determine the location of the unmanaged sensor 108 with respect to the managed sensors 106(1) and 106(2), several different locations for the unmanaged sensor 108 may be determined based on various combinations of the distances 908, 910 and angles 904, 906 measured. Accordingly, the calculated location of the unmanaged sensor may be determined as an average of the calculated locations, or may be determined by another suitable function based on the determined accuracy of the angle measurement vs. the distance measurement.

As one example, it is known in the art that received signal strength decays as a power law of the distance between a transmitter and a receiver. Accordingly, in the case of RSSI, the distance between an unmanaged sensor and a managed sensor may be calculated from a measured signal strength (e.g., in dBm) based on the following equation:

$$\text{RSSI[dBm]} = -N \log \text{Distance} + A, \quad\quad\quad (EQ1)$$

where N and A are constant parameters for the system. Further, while one example technique for determining the distance between a transmitter and a receiver based on measured signal strength is described herein, other techniques will be apparent to those of skill in the art having the benefit of the disclosure herein.

Figure 10:
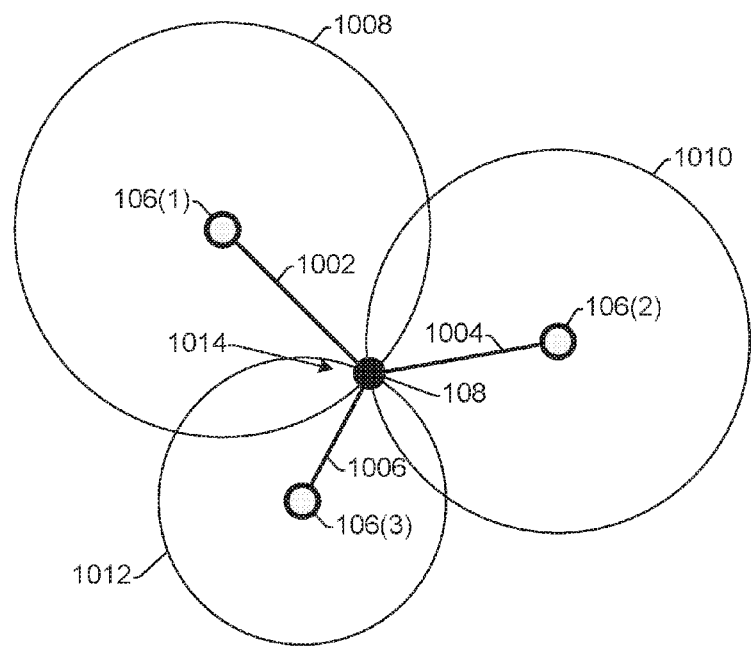
FIG. 10 illustrates an example of trilateration according to some implementations.

FIG. 10 illustrates an example 1000 of trilateration according to some implementations. Trilateration includes determining the location of a point based on distances from three points whose locations are known. For example, trilateration may be used to determine the location of an unmanaged sensor 108 relative to three managed sensors 106(1), 106(2), and 106(3), whose locations are known. In contrast to triangulation, trilateration does not involve the measurement of angles, and therefore the managed sensors 106 in this example may include a simple antenna that does not indicate the direction from which the signal is received and/or do not include radio direction finding capability.

Based on measured signal strengths of the transmission from the unmanaged sensor 108 received by the managed sensors 106(1), 106(2) and 106(3), the gateway computing device may determine the distance to the unmanaged sensor 108 from each of the managed sensors 106(1), 106(2) and 106(3). Thus, based on detected signal strengths, the first managed sensor 106(1) may be determined to be a first distance 1002 from the unmanaged sensor 108; the second managed sensor 106 may be determined to be a second distance 1004 from the unmanaged sensor 108; and the third managed sensor 106 may be determined to be a third distance 1006 from the unmanaged sensor 108. Each of these distances 1002, 1004, and 1006 may be expressed as the radius of a respective circle 1008, 1010, and 1012, having the respective managed sensor 106(1), 106(2), or 106(3) at the center. The intersection 1014 of the three circles 1008, 1010, and 1012 may be determined to be the location of the unmanaged sensor 108. If there are more than three managed sensors reporting the signal strength information of the unmanaged sensor 108, then there may be multiple intersections corresponding to multiple detected locations, and the multiple locations may be averaged to determine the final calculated location of the unmanaged sensor 108.

Figure 11:
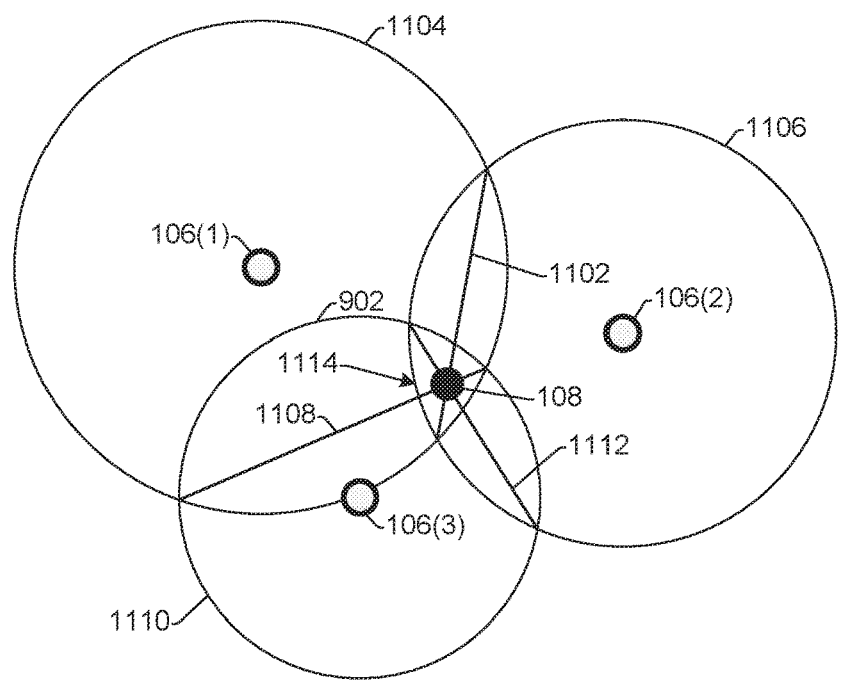
FIG. 11 illustrates an example of triangulation according to some implementations.

FIG. 11 illustrates an example 1100 of triangulation according to some implementations. The example of FIG. 11 employs a triangulation setup in a 2D plane using geometric circle intersections. In this example, a three object triangulation algorithm based on the power center (or radical center) of three circles may be employed for determining the location of the unmanaged sensor 108 with respect to three managed sensors 106(1), 106(2) and 106(3). The power center of three circles is the unique point of equal power with respect to the three circles. The power line (or radical axis) of two circles is the locus of points having the same power with respect to each circle. The power line is perpendicular to the line joining the circle centers and passes through the circle intersections, when they exist. For instance, in FIG. 11, a power line 1102 between a first circle 1104 and a second circle 1106 is at the intersection of these two circles; a power line 1108 between the first circle and a third circle 1110 is at the intersection of these two circles; and a power line 1112 is at the intersection of the third circle and the second circle. The intersection 1114 of the power lines is determined to be the location of the unmanaged sensor 108. For an example of a specific algorithm for calculating a location based on this technique, see, e.g., Pierlot et al., "A New Three Object Triangulation Algorithm Based on the Power Center of Three Circles", *Research and Education in Robotics* (EUROBOT), volume 161 of *Communications in Computer and Information Science*, pages 248-262, 2011, which is incorporated herein by reference. Further, while several techniques for determining the location of the sensor based on sensed signal strength are described herein, other variations and other techniques will be apparent to those of skill in the art having the benefit of the disclosure herein. Accordingly, implementations herein are not limited to any particular technique for calculating the relative location of a sensor.

FIG. 12 illustrates an example data structure 1200 of received sensed data information according to some implementations. In this example, the data structure 1200 may be maintained by the gateway computing device 104 and may include the sensed data information that is generated at the unmanaged sensors (e.g., the unmanaged sensor having the sensor ID X in FIG. 2) and received by the gateway computing device. The data structure 1200 includes a communication number 1202 assigned for each received transmission and a gateway timestamp 1204 that is associated with the received sensed data when the sensed data is received by the gateway computing device. In addition, the data structure 1200 includes the sensed data information, which includes the sensor timestamp 1206 of when the sensed data was sensed by the reporting sensor, the sensor ID 1208 of the reporting sensor, and the sensed data 1210, which in this example is a measured temperature. To correlate the information in the data structure 1200 with the information in FIG. 2, the sensed data was sent at the time t1$x$ from unmanaged sensor having sensor ID "X", and the timestamp 1206 of "01:00:01" may correspond to t1$d$, and the data-1 may correspond to the temperature 61 degrees. Further, the gateway timestamp 1204 that is recorded at the gateway computing device "01:00:01" may correspond to t1$g$ in FIG. 2. The information entered for communication 2 in the data structure 1200 may be similarly corresponded to another transmission of sensed data by unmanaged sensor X not shown in FIG. 2.

FIG. 13 illustrates an example data structure 1300 of received signal strength information according to some implementations. The data structure 1300 may be maintained by the gateway computing device 104 and populated with signal strength information received from the managed sensors such as discussed above with respect to FIG. 2. The data structure 1300 in this example includes a sequence number 1302 assigned as signal strength information transmissions are received from the managed sensors. Further, the data structure 1300 includes at least one timestamp 1304 associated with the signal strength information by the respective managed sensor, such as when the signal first begins to be received by the managed sensor. In some examples, two time stamps may be included in the data structure 1300 for each received signal strength transmission, such as a beginning timestamp and an ending timestamp, as discussed above with respect to FIG. 6. In addition, the data structure 1300 may include a sensor ID 1306 of the managed sensor that sent the signal strength information. Furthermore, the data structure 1300 may include the signal strength information 1308, which in this example includes a measured signal strength, a determined frequency of the signal, and a duration of the signal (i.e., the difference between the ending timestamp and the beginning time stamp). The signal strength in this case is expressed in decibel milliamps, but may be expressed in other units or by other terminology in other examples. Further, in the case that the managed sensors also are configured to detect a direction from which the signal was received, the data structure 1300 may include one or more additional columns to provide direction information.

As one example, sequence number 1 may correspond to the transmission 204 received by the gateway computing device in FIG. 2, in which the transmission is received from the managed sensor having sensor ID A, with a timestamp of t1$a$ which is "01:00:01" in this example about the transmission 202 sent by the unmanaged sensor X, with a detected signal strength SS-1$a$ equal to −40 dBm, at a frequency F1 for a duration T1. Sequence number 2 may correspond to the transmission 206 received by the gateway computing device from the second managed sensor having sensor ID B, and sequence number 3 may correspond to yet another transmission from a third managed sensor "C" not shown in FIG. 2.

FIG. 14 illustrates example data structures 1400, 1402, and 1404 for determining sensor locations for detecting anomalous sensors according to some implementations. The data structures 1400, 1402, and 1404 may be generated by the gateway computing device when determining whether there are anomalous sensors, as discussed above, e.g., with respect to FIGS. 7 and 8.

In this example, data structure 1400 is generated from the information in the data structure 1300 by comparing the timestamps 1304 for a plurality of received signal strength information transmissions to identify sets of related timestamps that are the same or within a threshold time of each other, as discussed above, e.g., with respect to FIG. 7, block 710. For example, the data structure 1400 includes an item number 1412, a timestamp 1414, signal strength (SS) data 1416, a calculated location 1418 that is determined from the signal strength data 1416, and a signal transmission duration 1420. The SS information 1416 for item 1 may correspond to the signal strength information of the sequence numbers 1-3 in data structure 1300. The transmission duration or other signal properties may also be used to confirm or help identify related signal strength data. Accordingly, the data structure 1400 includes three sets of related signal strength data, with item 1 corresponding to a first set, item 2 corresponding to a second set that is contiguous with the first set, and items 3-6 corresponding to a third set.

In this example, suppose that trilateration is being used to determine the location of the sensor, and therefore three SS information are used to calculate the location of the reporting sensor, e.g., as discussed above with respect to FIG. 7, block 712 and FIG. 10. Thus, for item 1, there is only one combination of the three related SS data, i.e., A: −40, B: −50, C: −30, resulting in a calculated location of the reporting sensor as position P1. Similarly, item 2 in data structure 1400 corresponds to sequence numbers 4-6 of the data structure 1300, which also leads to only one combination of three SS information, i.e., A: −45, B: −55, D: −40, resulting in a calculated location of the reporting sensor as position P2. Further, items 3-6 of the data structure 1400 correspond to sequence numbers 7-10 of the data structure 1300. In this case, there are four signal strength readings from four different managed sensors, but only three SS readings are used for determining the position by trilateration. Accordingly, there may be four different combinations of the four SS readings, resulting in four location calculations P3, P4, P5, and P6.

Data structure 1402 includes an item number 1422, a timestamp 1424, a location 1426, and a transmission duration 1428. For example, data structure 1402 may result at least partially from execution of block 714 in FIG. 7. In data structure 1404, locations may be determined, such as by averaging, if there is more than one calculated location. Accordingly, for item 1, a location P1 is calculated based on the SS data in item 1 in data structure 1400. Similarly, for item 2, a location P2 is calculated based on the SS data in item 2 in data structure 1400. Additionally, for item 3, the location is equal to (P3+P4+P5+P6)/4 since there are four locations determined for the third timestamp (items 3-6 in data structure 1400).

Data structure 1404 includes an item number 1432, a sequence identifier 1434, a sensor ID 1436, a location 1438, and a note 1440. For example, at block 710 in FIG. 7, the gateway computing device may determine that item 1 in data structure 1400 may be determined to be contiguous with item 2 based on the timestamps being within a threshold time of each other and the signal properties being the same. Thus, item 1 and item 2 may be considered to be a series of the same data transmission flow. In addition, at block 804, the gateway computing device may determine that item 1 in data structure 1400 has the same timestamp as communication 1 in data structure 1200, and also has the same signal properties, e.g., transmission duration equals T1. Further, the gateway computing device may determine that the series of data transmission in data structure 1400 is not finished at item 1 of data structure 1400, but is continued at item 2. This means that the sensed data of communication 1 of data structure 1200 already reached the gateway computing device when the signal strength transmissions of item 1 of data structure 1400 occurred. Therefore, the data transmission corresponding to the signal strength transmissions of item 2 was not necessary and was not received by the gateway computing device. Accordingly, item 2 of data structure 1400 is considered to be an anomaly candidate at block 810 of FIG. 8.

In the data structure 1404, item 1 and item 2 are indicated to be part of the same contiguous series "S1". Further, in item 1 of data structure 1404, the sensor ID X is associated with the location P1 calculated from the signal strength information included in item 1 of data structure 1400. Additionally, in item 2 of data structure 1404, the sensor ID is indicated to be unknown, the location is identified as P2 calculated based on the information for item 2 in data structure 1400, and a note is added that this sensor is an anomaly candidate. In addition, in item 3 of data structure, 1404, this item is a separate series "S2" from items 1 and 2, is also associated with sensor ID X and has a calculated location Px2 that is the average of preliminary locations P3, P4, P5, and P6.

FIG. 15 illustrates example data structures 1500 and 1502 for detecting anomalous sensors according to some implementations. The data structures 1500 and 1502 may be generated and/or maintained by the gateway computing device, and may be used when determining whether there are anomalous sensors, as discussed above, e.g., with respect to FIGS. 7 and 8.

Data structure 1500 is a sensor inventory data structure that includes an item number 1504, a sensor ID 1506, and a location 1508. For example, the sensor inventory data structure may be constructed by the gateway computing device and/or the management computing device when the sensor network is created, and may be updated as sensors are added or removed from the network and/or as the physical location of sensors changes in the network. As discussed above, at blocks 722 and 724 of FIG. 7, the sensor ID and location determined in data structure 1404 may be compared with the inventory data structure 1500. For example, if the location P2 is not associated with a sensor in the inventory data structure 1500, then the unknown sensor is marked as an anomaly candidate.

Data structure 1502 includes an item number 1512, a sensor ID 1514, a location 1516 and a note 1518. The data structure 1502 may be calculated by the gateway computing device based on data structure 1404 and historical sensor location information (not shown in FIG. 15) which may include previously determined locations for the sensors. Further, the data structure 1502 may correspond to execution of blocks 718 and 720 of FIG. 7. In this example, suppose that for item 1, the location of the sensor X is recalculated based on determination of the location Px2 at item 3 of data structure 1404. For example, if the location Px2 is within a threshold distance of the prior location, then the location of the recalculated location for sensor X is Px=(Px1+Px2)/2, i.e., the average of the previously calculated location(s) and the currently calculated location. As mentioned above, if the currently calculated location Px2 is more than a threshold distance from the previously calculated location Px1, then averaging may not be performed since the previous location may not be relevant to the current location. The value for Px may replace Pxi in the inventory data structure 1500. Further, item 2 remains unknown and is indicated to be an anomaly candidate to be investigated by a system administrator or other user of the system.

Figure 16:
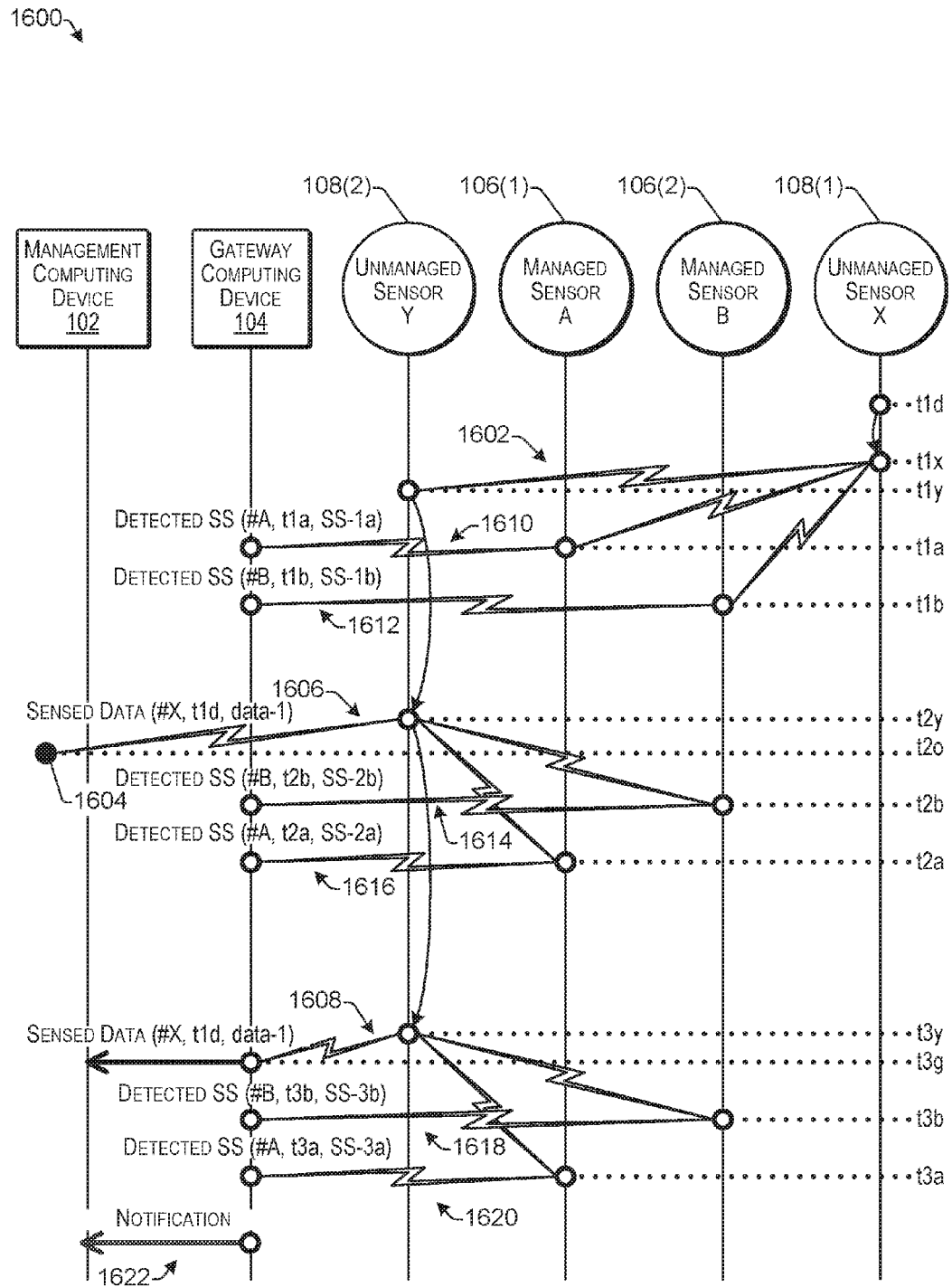
FIG. 16 illustrates an example sequence diagram according to some implementations.

FIG. 16 illustrates an example sequence diagram according to some implementations. This example may correspond to a multi-hop wireless sensor network. Accordingly, a difference from the example of FIG. 2 is that the sensed data may be transmitted from the first unmanaged sensor 108(1) to another sensor in the sensor network, such as the second unmanaged sensor 108(2), which in turn forwards the sensed data to the gateway computing device 104. However, if the second unmanaged sensor 108(2) has been compromised, the second unmanaged sensor 108(2) may also send the sensed data to an outside target. Accordingly, implementations herein are able to detect this as an anomaly for further investigation.

In this example, suppose that the unmanaged sensor 108(1) sends a first sensed data transmission 1602 that may include sensed data "data-1", a timestamp "t1$d$" associated with the collected sensed data, and the sensor ID "X". The second unmanaged sensor 108(2) may receive the sensed data information transmission 1602 at time "t1$y$" and may send the sensed data information to an outside target 1604 in a second transmission 1606 at a time t2$y$, which is received by the outside target 1604 at a time t2$o$.

In addition, the second unmanaged sensor 108(2) may forward the transmission to the gateway computing device 104 at time t3$y$ in a third transmission 1608. The gateway computing device 104 may receive the transmission 1608 from the second unmanaged sensor 108(2) at time t3$g$, and may forward the information included in the transmission 1604 to the management computing device 102. Further, the gateway computing device 104 may record its own timestamp of the time "t3$g$" at which the gateway computing device 104 received the forwarding transmission 1608 from the second unmanaged sensor 108(2).

Some of the managed sensors 106 that are located near the first unmanaged sensor 108(1) may also detect the radio signal of the transmission 1602. Thus, in addition to the second unmanaged sensor 108(2) receiving the communication 1602, two or more managed sensors 106 may also receive the transmission 1602 and/or may otherwise detect the signal strength of the transmission 1602. For instance, the first managed sensor 106(1) and the second managed sensor 106(2) may each send signal strength information to the gateway computing device 104, along with respective timestamps of when the signal strength was detected, and respective sensor IDs of the respective managed sensors 106(1) and 106(2). Thus, the first managed sensor 106(1) may send a communication 1610 that includes the sensor ID "A", the timestamp "t1$a$" of when the first managed sensor 106(1) detected the signal strength of the transmission 1602, and the signal strength information "SS-1$a$". Similarly, the second managed sensor 106(2) may send a communication 1612 that includes the sensor ID "B", the timestamp "t1b" of when the second managed sensor 106(2) detected the signal strength of the transmission 1602, and the signal strength information "SS-1b". In some cases, the respective timestamps t1a and t2a measured on the managed sensors 106(1) and 106(2), respectively, may include single timestamps of when the signal strength is detected. Alternatively, in some cases, the respective timestamps t1a and t2a measured on managed sensors 106(1) and 106(2), respectively, may include timestamps of the beginning and the ending of the signal detection, as discussed, e.g., with respect to FIG. 6. Alternatively, the signal strength information may include signal properties, such as frequency, modulation, duration, etc. The gateway computing device 104 may store the received signal strength information received via the transmissions 1610 and 1612.

In addition, when the second unmanaged sensor 108(2) transmits the communication 1606 to the outside target device 1604, one or more of the managed sensors 106(1) and 106(2) may also receive the transmission 1606 and/or may otherwise detect the signal strength of the transmission 1606. For instance, the first managed sensor 106(1) may detect the signal strength of the transmission 1606 at a time "t2a". Further, the second managed sensor 106(2) may detect the signal strength of the transmission 1606 at a time "t2b". In this example, the first managed sensor 106(1) and the second managed sensor 106(2) may each send signal strength information to the gateway computing device 104, along with respective timestamps of when the signal strength was detected, and respective sensor IDs of the respective managed sensors 106(1) and 106(2). Thus, the second managed sensor 106(2) may send a communication 1614 that includes the sensor ID "B", the timestamp "t2b" of when the second managed sensor 106(2) detected the signal strength of the transmission 1606, and the signal strength information "SS-2b". Similarly, the first managed sensor 106(1) may send a communication 1616 that includes the sensor ID "A", the timestamp "t2a" of when the first managed sensor 106(1) detected the signal strength of the transmission 1606, and the signal strength information "SS-2a".

In addition, when the second unmanaged sensor 108(2) transmits the forwarding message 1608 to the gateway computing device 104, one or more of the managed sensors 106(1) and 106(2) may also receive the transmission 1608 and/or may otherwise detect the signal strength of the transmission 1608. For instance, the first managed sensor 106(1) may detect the signal strength of the transmission 1608 at a time "t3a". Further, the second managed sensor 106(2) may detect the signal strength of the transmission 1608 at a time "t3b". In this example, the first managed sensor 106(1) and the second managed sensor 106(2) may each send signal strength information to the gateway computing device 104, along with respective timestamps of when the signal strength was detected, and respective sensor IDs of the respective managed sensors 106(1) and 106(2). Thus, the second managed sensor 106(2) may send a communication 1618 that includes the sensor ID "B", the timestamp "t3b" of when the second managed sensor 106(2) detected the signal strength of the transmission 1608, and the signal strength information "SS-2b". Similarly, the first managed sensor 106(1) may send a communication 1620 that includes the sensor ID "A", the timestamp "t3a" of when the first managed sensor 106(1) detected the signal strength of the transmission 1608, and the signal strength information "SS-2a".

The gateway computing device 104 may receive the transmissions 1614, 1616, 1618, and 1620 from the managed sensors 106(1) and 106(2), respectively, and may store the received signal strength information from the transmissions 1614, 1616, 1618, and 1620. As discussed below, the gateway computing device 104 is able to associate the received sensed data, data-1, and the sensor ID X with the detected signal strength(s) (detected SS) SS-1a and SS-1b, rather than SS-2a and SS-2b or SS-3a and SS-3b based at least in part on comparing the timestamp t3g recorded at the gateway computing device 104 with the timestamps t3a, t3b, t2a, t2b, t1a, and t1b, to determine that these timestamps are considered a contiguous series of data transmissions. As discussed additionally below, the gateway computing device 104 may determine the location of the first unmanaged sensor 108(1) based at least partially on the received detected signal strength information SS-1a and SS-1b, and may detect the location of the second unmanaged sensor 108(2) based at least partially on the received signal strength information SS-2a, SS-2b, SS-3a, and SS-3b. The gateway computing device 104 may send the location information for at least the first sensor to the management computing device 102 for use in determining an analysis result based at least in part on the sensed data "data-1". Alternatively, the gateway computing device 104 may forward the detected SS information from communications 1610, 1612, 1614, 1616, 1618 and 1620 to the management computing device 102, and the management computing device 102 may perform the processing to determine the location of the first unmanaged sensor 108(1) and the anomalous behavior of the second unmanaged sensor 108(2).

Upon detecting a candidate anomaly associated with at least one sensor, the gateway computing device 104 may send a notification 1622 or other communication to the management computing device 102. In some cases, the notification may include location information indicating the physical location of the candidate anomalous sensor.

FIG. 17 illustrates an example data structure 1700 of received sensed data information according to some implementations. In this example, the data structure 1700 may be maintained by the gateway computing device 104 and may include the sensed data information that is generated at the unmanaged sensors (e.g., reported by the unmanaged sensor having the sensor ID X in FIG. 16) and received by the gateway computing device. The data structure 1700 includes a communication number 1702 assigned for each received transmission and a gateway timestamp 1704 that is associated with the received sensed data when the sensed data is received by the gateway computing device. In addition, the data structure 1700 includes the sensed data information, which includes the sensor timestamp 1706 of when the sensed data was sensed by the reporting sensor, the sensor ID 1708 of the reporting sensor, and the sensed data 1710, which in this example is a measured temperature. To correlate the information in the data structure 1700 with the information in FIG. 16, the sensed data was sent at the time t1x from unmanaged sensor having sensor ID "X", and the timestamp 1706 of "01:00:01" may correspond to t1d, and the data-1 may correspond to the temperature 61 degrees. Further, the gateway timestamp 1704 that is recorded at the gateway computing device "01:00:03" may correspond to t3g in FIG. 16.

FIG. 18 illustrates an example data structure 1800 of received signal strength information according to some implementations. The data structure 1800 may be maintained by the gateway computing device 104 and populated with signal strength information received from the managed sensors such as discussed above with respect to FIG. 16. The data structure 1800 in this example includes a sequence number 1802 assigned as signal strength information transmissions are received from the managed sensors. Further, the data structure 1800 includes at least one timestamp 1804 associated with the signal strength information by the respective managed sensor, such as when the signal first begins to be received by the managed sensor. In some examples, two time stamps may be included in the data structure 1800 for each received signal strength transmission, such as a beginning timestamp and an ending timestamp, as discussed above with respect to FIG. 6. In addition, the data structure 1800 may include a sensor ID 1806 of the managed sensor that sent the signal strength information. Furthermore, the data structure 1800 may include the signal strength information 1808, which in this example includes a measured signal strength, a determined frequency of the signal, and a duration of the transmission (i.e., the difference between the ending timestamp and the beginning time stamp). The signal strength in this case is expressed in decibel milliamps, but may be expressed in other units or by other terminology in other examples. Further, in the case that the managed sensors also are configured to detect a direction from which the signal was received, the data structure 1800 may include one or more additional columns to provide direction information.

As one example, sequence number 1 may correspond to the transmission 1610 received by the gateway computing device in FIG. 16, in which the transmission is received from the managed sensor having sensor ID A, with a timestamp of t1a which is "01:00:01" in this example about the transmission 1602 sent by the unmanaged sensor X, with a detected signal strength SS-1a equal to −40 dBm, at a frequency F1 for a duration T1. Sequence number 2 may correspond to the transmission 1612 received by the gateway computing device from the second managed sensor having sensor ID B, and sequence number 3 may correspond to yet another transmission from a third managed sensor "C" not shown in FIG. 16 including additional signal strength information related to the transmission 1602.

Figure 19:
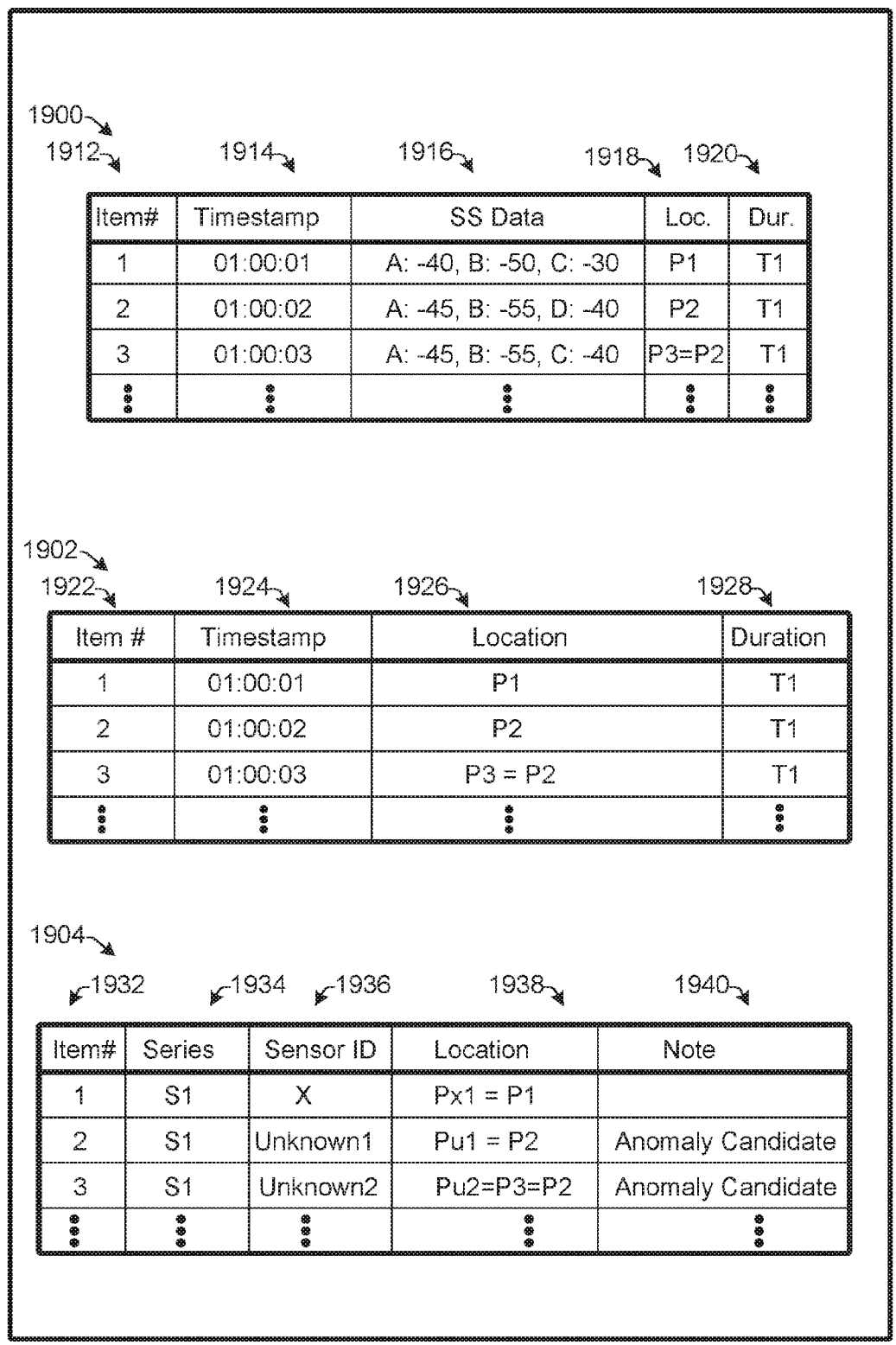
FIG. 19 illustrates example data structures for determining anomalous sensors according to some implementations.

FIG. 19 illustrates example data structures 1900, 1902, and 1904 for determining sensor locations for detecting anomalous sensors according to some implementations. The data structures 1900, 1902, and 1904 may be generated by the gateway computing device when determining whether there are anomalous sensors, as discussed above, e.g., with respect to FIGS. 7 and 8.

In this example, data structure 1900 is generated from the information in the data structure 1800 by comparing the timestamps 1804 for a plurality of received signal strength information transmissions to identify sets of related timestamps that are the same or within a threshold time of each other, as discussed above, e.g., with respect to FIG. 7, block 710. For example, the data structure 1900 includes an item number 1912, a timestamp 1914, signal strength (SS) data 1916, a calculated location 1918 that is determined from the signal strength data 1916, and a signal transmission duration 1920. The SS information 1916 for item 1 may correspond to the signal strength information of the sequence numbers 1-3 in data structure 1800. The transmission duration or other signal properties may also be used to confirm or help identify related signal strength data. Accordingly, the data structure 1900 includes three sets of related signal strength data, with item 1 corresponding to a first set, item 2 corresponding to a second set that is contiguous with the first set, and item 3 corresponding to a third set that is contiguous with the second set.

In this example, suppose that trilateration is being used to determine the location of the sensor, and therefore three SS information are used to calculate the location of the reporting sensor, e.g., as discussed above with respect to FIG. 7, block 712 and FIG. 10. For instance, for item 1, there is only one combination of the three related SS data, i.e., A: −40, B: −50, C: −30, resulting in a calculated location of the reporting sensor as position P1. Similarly, item 2 in data structure 1900 corresponds to sequence numbers 4-6 of the data structure 1800, which also leads to only one combination of three SS information, i.e., A: −45, B: −55, D: −40, resulting in a calculated location of the reporting sensor as position P2. Similarly, item 3 in data structure 1900 corresponds to sequence numbers 7-9 of the data structure 1800, which also leads to only one combination of three SS information, i.e., A: −45, B: −25, D: −55, resulting in a calculated location of the reporting sensor as position P3. In this example, P3 is equal to, or within a threshold distance of, P2. Further, the three sets may be determined to be contiguous and therefore part of a series, based at least partially on the same signal properties, e.g., duration T1, as well as the timestamps being within a threshold time of each other.

Data structure 1902 includes an item number 1922, a timestamp 1924, a location 1926, and a transmission duration 1928. For example, data structure 1902 may result from execution of block 714 in FIG. 7. In data structure 1904, locations may be determined, such as by averaging, if there is more than one calculated location. However, in this example, averaging is not used since only one location is determined for each set of related signal strength information. Accordingly, for item 1, a location P1 is calculated based on the SS data in item 1 in data structure 1900. Similarly, for item 2, a location P2 is calculated based on the SS data in item 2 in data structure 1900. Similarly, for item 3, a location P3 is calculated based on the SS data in item 3 in data structure 1900. As mentioned above P3 may equal, or may be within a threshold distance of, P2, such as to indicate that the locations P2 and P3 correspond to the same sensor.

Data structure 1904 includes an item number 1932, a sequence identifier 1934, a sensor ID 1936, a location 1938, and a note 1940. For example, at block 710 in FIG. 7, the gateway computing device may determine that item 1 in data structure 1900 may be determined to be contiguous with item 2 based on the timestamps being within a threshold time of each other and the signal properties being the same. Item 3 may be similarly determined to be contiguous with items 2 and items 1. Thus, items 1, 2, and 3 may be considered to be a series "S1" of the same data transmission flow. In addition, at block 804, the gateway computing device may determine that item 3 in data structure 1900 has the same timestamp as communication 1 in data structure 1700, and also has the same signal properties, e.g., transmission duration equals T1. Further, the gateway computing device may determine that the series of data transmission in data structure 1900 is not finished at item 1 of data structure 1900, but is continued at items 2 and 3. Accordingly, at block 804 of FIG. 8, the gateway computing device determines that there is sensed data with the same timestamp (or within a threshold time sufficiently close to be considered the same) as the last signal strength data timestamp. At block 806 of FIG. 8, the gateway computing device determines that there is a sensor with the same location and a different time stamp, i.e., P3=P2, and the timestamp for item 2 is different from that for item 3 in data structures 1400 and 1402. This indicates that the sensed data was transmitted to an additional destination, which is anomalous behavior. Therefore, the data transmission corresponding to the signal strength transmissions of item 2 was not necessary and was not received by the gateway computing device. Accordingly, items 2 and 3 of data structure 1904 may be considered to be anomaly candidates at block 810 of FIG. 8.

In the data structure 1904, items 1, 2, and 3 are indicated to be part of the same contiguous series "S1". Further, in item 1 of data structure 1904, the sensor ID X is associated with the location P1 calculated from the signal strength information included in item 1 of data structure 1900 based on being the earliest timestamp in the series S1. Additionally, in item 2 of data structure 1904, the sensor ID is indicated to be unknown, the location is identified as P2 calculated based on the information for item 2 in data structure 1900, and a note is added that this sensor is an anomaly candidate. In addition, in item 3 of data structure 1904, the sensor ID is also indicated to be unknown, the location is identified as P3 calculated based on the information for item 3 in data structure 1900, and a note is added that this sensor is an anomaly candidate.

FIG. 20 illustrates example data structures 2000 and 2002 for detecting anomalous sensors according to some implementations. The data structures 2000 and 2002 may be generated and/or maintained by the gateway computing device, and may be used when determining whether there are anomalous sensors, as discussed above, e.g., with respect to FIGS. 7 and 8.

Data structure 2000 is a sensor inventory data structure that includes an item number 2004, a sensor ID 2006, and a location 2008. For example, the sensor inventory data structure may be constructed by the gateway computing device and/or the management computing device when the sensor network is created, and may be updated as sensors are added or removed from the network and/or as the physical location of sensors changes in the network. As discussed above, at blocks 722 and 724 of FIG. 7, the sensor ID and location determined in data structure 1904 may be compared with the inventory data structure 2000. For example, if the locations P2 and P3 are not associated with a sensor in the inventory data structure 2000, then the unknown sensor is marked as an anomaly candidate.

Data structure 2002 includes an item number 2012, a sensor ID 2014, a location 2016, and a note 2018. The data structure 2002 may be calculated by the gateway computing device based on data structure 1904 and historical sensor location information (not shown in FIG. 20) which may include previously determined locations for the sensors, if any. Further, the data structure 2002 may correspond to execution of blocks 718 and 720 of FIG. 7. In this example, suppose that for item 1, the location of the sensor X is not recalculated since there is no historic location data or otherwise previously determined location data for sensor X. Further, item 2 remains unknown and is indicated to be an anomaly candidate to be investigated by a system administrator or other user of the system.

Figure 21:
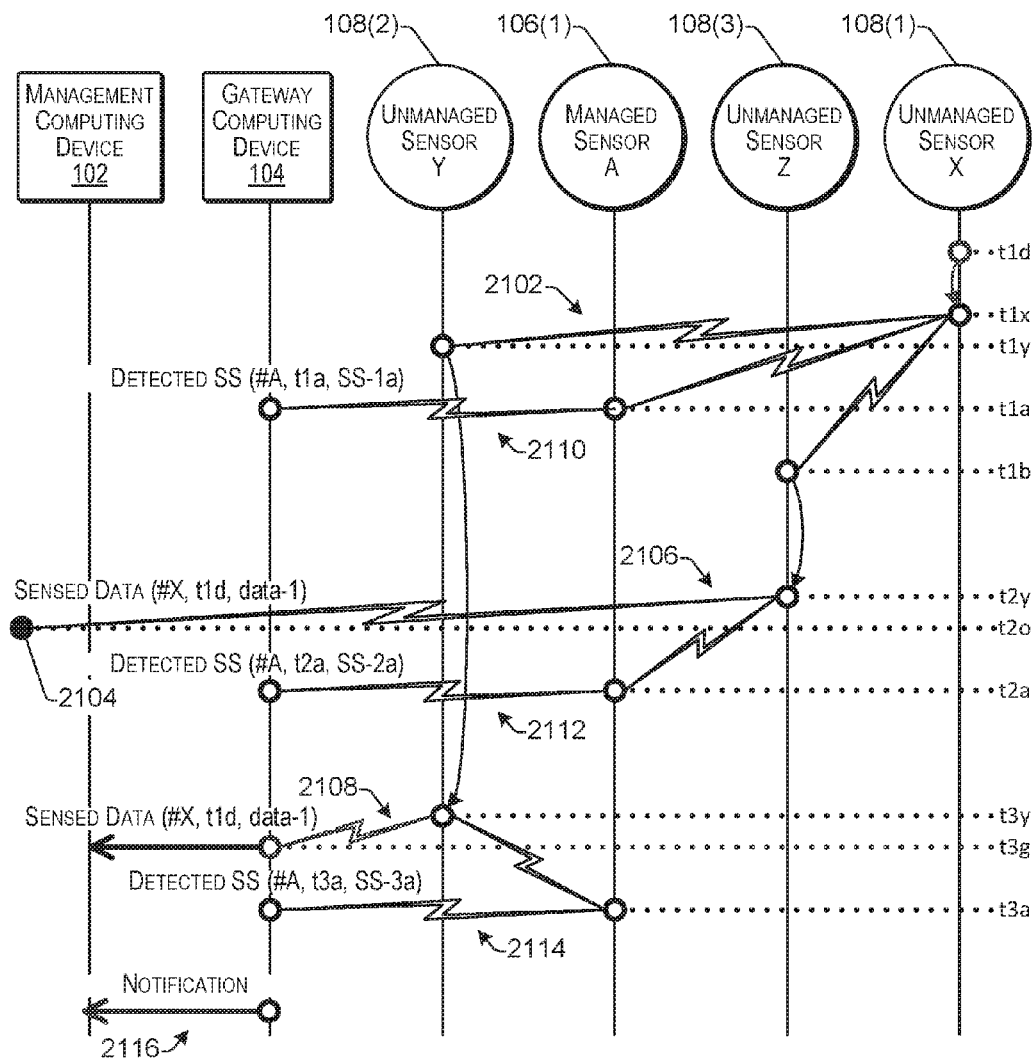
FIG. 21 illustrates an example sequence diagram according to some implementations.

FIG. 21 illustrates an example sequence diagram according to some implementations. This example may correspond to a multi-hop wireless sensor network. Accordingly, a difference from the example of FIG. 2 is that the sensed data may be transmitted from the first unmanaged sensor 108(1) to another sensor in the sensor network, such as the second unmanaged sensor 108(2), which in turn forwards the sensed data to the gateway computing device 104. However, in this example, suppose that a snooping sensor, referred to herein as third unmanaged sensor 108(3), has been planted in the system or that a legitimate sensor has been compromised to eavesdrop on sensed data communications and transmit the sensed data to a target device outside the sensor network. Accordingly, implementations herein are able to detect this as an anomaly for further investigation.

In this example, suppose that the unmanaged sensor 108(1) sends a first sensed data transmission 2102 that may include sensed data "data-1", a sensed data timestamp "t1d" associated with the collected sensed data, and the sensor ID "X". The third unmanaged sensor 108(3), having a sensor ID "Z" in this example, may receive the transmission 2102, and may send the sensed data information to an outside target 2104 in a second transmission 2106 at a time t2y, which is received by the outside target 2104 at a time t2o.

Furthermore, the second unmanaged sensor 108(2) may receive the sensed data information transmission 2102 at time "t1y". The second unmanaged sensor 108(2) may forward the transmission to the gateway computing device 104 at time t3y in a third transmission 2108. The gateway computing device 104 may receive the transmission 2108 from the second unmanaged sensor 108(2) at time t3g, and may forward the information included in the transmission 2104 to the management computing device 102. Further, the gateway computing device 104 may record its own timestamp of the time "t3g" at which the gateway computing device 104 received the forwarding transmission 2108 from the second unmanaged sensor 108(2).

Some of the managed sensors 106 that are located near the first unmanaged sensor 108(1) may also detect the radio signal of the transmission 2102. Thus, in addition to the second unmanaged sensor 108(2) and the third unmanaged sensor 108(3) receiving the communication 2102, two or more managed sensors 106 may also receive the transmission 2102 and/or may otherwise detect the signal strength of the transmission 2102 (only the first managed sensor 106(1) is illustrated in this example for clarity). For instance, the first managed sensor 106(1) may send signal strength information to the gateway computing device 104, along with a timestamp of when the signal strength was detected, and its sensor ID. Thus, the first managed sensor 106(1) may send a communication 2110 that includes the sensor ID "A", the timestamp "t1a" of when the first managed sensor 106(1) detected the signal strength of the transmission 2102, and the signal strength information "SS-1a". In some cases, the timestamps t1a measured on the managed sensor 106(1) may include a single timestamp of when the signal strength is detected. Alternatively, in some cases, the timestamp t1a measured on the managed sensors 106(1) may include timestamps of the beginning and the ending of the signal detection, as discussed, e.g., with respect to FIG. 6. Additionally, the signal strength information may include signal properties, such as frequency, modulation, duration, etc. The gateway computing device 104 may store the received signal strength information received via the transmission 2110.

In addition, when the third unmanaged sensor 108(3) transmits the communication 2106 to the outside target device 2104, one or more of the managed sensors may also receive the transmission 2106 and/or may otherwise detect the signal strength of the transmission 2106. For instance, the first managed sensor 106(1) may detect the signal strength of the transmission 2106 at a time "t2a". In this example, the first managed sensor 106(1) may send signal strength information to the gateway computing device 104, along with a timestamp of when the signal strength was detected, and a sensor ID of the managed sensor 106(1). Thus, the first managed sensor 106(1) may send a communication 2112 that includes the sensor ID "A", the timestamp "t2a" of when the first managed sensor 106(1) detected the signal strength of the transmission 2106, and the signal strength information "SS-2a".

In addition, when the second unmanaged sensor 108(2) transmits the forwarding message 2108 to the gateway computing device 104, the managed sensors may also receive the transmission 2108 and/or may otherwise detect the signal strength of the transmission 2108. For instance, the first managed sensor 106(1) may detect the signal strength of the transmission 2108 at a time "t3a". In this example, the first managed sensor 106(1) may send signal strength information to the gateway computing device 104, along with a timestamp of when the signal strength was detected, and the sensor ID of the managed sensor 106(1). Thus, the first managed sensor 106(1) may send a communication 2114 that includes the sensor ID "A", the timestamp "t3a" of when the first managed sensor 106(1) detected the signal strength of the transmission 2108, and the signal strength information "SS-2a".

The gateway computing device 104 may receive the transmissions 2110, 2112, and 2114 from the managed sensor 106(1), and may store the received signal strength information from the transmissions. As discussed below, the gateway computing device 104 is able to associate the received sensed data, data-1, and the sensor ID X with the detected signal strength(s) (detected SS) SS-1a, rather than SS-2a or SS-3a based at least in part on comparing the timestamp t3g recorded at the gateway computing device 104 with the timestamps t3a, t2a, and t1a to determine that these timestamps are considered a contiguous series of data transmissions. As discussed additionally below, the gateway computing device 104 may determine the location of the first unmanaged sensor 108(1) based at least partially on the received detected signal strength information SS-1a, may detect the location of the second unmanaged sensor 108(2) based at least partially on the received signal strength information SS-3a, and may detect the location of the third unmanaged sensor 108(3) based at least partially on the received signal strength information SS-2a. The gateway computing device 104 may send the location information for at least the first sensor to the management computing device 102 for use in determining an analysis result based at least in part on the sensed data "data-1". Alternatively, the gateway computing device 104 may forward the detected SS information from communications 2110, 2112, and 2114 to the management computing device 102, and the management computing device 102 may perform the processing to determine the location of the first unmanaged sensor 108(1) and the anomalous behavior of the third unmanaged sensor 108(3).

Upon detecting a candidate anomaly associated with at least one sensor, the gateway computing device 104 may send a notification 2116 or other communication to the management computing device 102. In some cases, the notification may include location information indicating the physical location of the candidate anomalous sensor.

FIG. 22 illustrates an example data structure 2200 of received sensed data information according to some implementations. In this example, the data structure 2200 may be maintained by the gateway computing device 104 and may include the sensed data information that is generated at the unmanaged sensors (e.g., the unmanaged sensor having the sensor ID X in FIG. 21) and received by the gateway computing device. The data structure 2200 includes a communication number 2202 assigned for each received transmission and a gateway timestamp 2204 that is associated with the received sensed data when the sensed data is received by the gateway computing device. In addition, the data structure 2200 includes the sensed data information, which includes the sensor timestamp 2206 of when the sensed data was sensed by the reporting sensor, the sensor ID 2208 of the reporting sensor, and the sensed data 2210, which in this example is a measured temperature. To correlate the information in the data structure 2200 with the information in FIG. 21, the sensed data was sent at the time t1x from unmanaged sensor having sensor ID "X", and the timestamp 2206 of "01:00:00" may correspond to t1d, and the data-1 may correspond to the temperature 61 degrees. Further, the gateway timestamp 2204 that is recorded at the gateway computing device "01:00:01" may correspond to t3g in FIG. 21.

FIG. 23 illustrates an example data structure 2300 of received signal strength information according to some implementations. The data structure 2300 may be maintained by the gateway computing device 104 and populated with signal strength information received from the managed sensors such as discussed above with respect to FIG. 21. The data structure 2300 in this example includes a sequence number 2302 assigned as signal strength information transmissions are received from the managed sensors. Further, the data structure 2300 includes at least one timestamp 2304 associated with the signal strength information by the respective managed sensor, such as when the signal first begins to be received by the managed sensor. In some examples, two time stamps may be included in the data structure 2300 for each received signal strength transmission, such as a beginning timestamp and an ending timestamp, as discussed above with respect to FIG. 6. In addition, the data structure 2300 may include a sensor ID 2306 of the managed sensor that sent the signal strength information. Furthermore, the data structure 2300 may include the signal strength information 2308, which in this example includes a measured signal strength, a determined frequency of the signal, and a duration of the signal (i.e., the difference between the ending timestamp and the beginning time stamp). The signal strength in this case is expressed in decibel milliamps, but may be expressed in other units or by other terminology in other examples. Further, in the case that the managed sensors also are configured to detect a direction from which the signal was received, the data structure 2300 may include one or more additional columns to provide direction information.

As one example, sequence number 1 may correspond to the transmission 2110 received by the gateway computing device in FIG. 21, in which the transmission is received from the managed sensor having sensor ID A, with a timestamp of t1a which is "01:00:01" in this example about the transmission 2102 sent by the unmanaged sensor X, with a detected signal strength SS-1a equal to −40 dBm, at a frequency F1 for a duration T1. Sequence number 4 may correspond to the transmission 2112 received by the gateway computing device from the first managed sensor at time t2a, and sequence number 7 may correspond to the transmission 2114 from the first managed sensor at time t3a.

FIG. 24 illustrates example data structures 2400, 2402, and 2404 for determining sensor locations for detecting anomalous sensors according to some implementations. The data structures 2400, 2402, and 2404 may be generated by the gateway computing device when determining whether there are anomalous sensors, as discussed above, e.g., with respect to FIGS. 7 and 8.

In this example, data structure 2400 is generated from the information in the data structure 2300 by comparing the timestamps 2304 for a plurality of received signal strength information transmissions to identify sets of related timestamps that are the same or within a threshold time of each other, as discussed above, e.g., with respect to FIG. 7, block 710. For example, the data structure 2400 includes an item number 2412, a timestamp 2414, signal strength (SS) data 2416, a calculated location 2418 that is determined from the signal strength data 2416, and a signal transmission duration 2420. The SS information 2416 for item 1 may correspond to the signal strength information of the sequence numbers 1-3 in data structure 2300. The transmission duration or other signal properties may also be used to confirm or help identify related signal strength data. Further, in this example, while the timestamps of items 2 and 3 are close in time, they are for different respective locations and have at least one managed sensor in common indicating that they relate to separate transmissions. Accordingly, the data structure 2400 includes three sets of related signal strength data, with item 1 corresponding to a first set, item 2 corresponding to a second set that is contiguous with the first set, and item 3 corresponding to a third set that is contiguous with the second set.

In this example, suppose that trilateration is being used to determine the location of the sensors, and therefore three SS information are used to calculate the location of the reporting sensor, e.g., as discussed above with respect to FIG. 7, block 712 and FIG. 10. For instance, for item 1, there is only one combination of the three related SS data, i.e., A: −40, B: −50, C: −30, resulting in a calculated location of the reporting sensor as position P1. Similarly, item 2 in data structure 2400 corresponds to sequence numbers 4-6 of the data structure 2300, which also leads to only one combination of three SS information, i.e., A: −45, B: −25, C: −55, resulting in a calculated location of the reporting sensor as position P2. Similarly, item 3 in data structure 2400 corresponds to sequence numbers 7-9 of the data structure 2300, which also leads to only one combination of three SS information, i.e., A: −50, B: −30, D: −55, resulting in a calculated location of the sensor as position P3. Further, the three sets may be determined to be contiguous and therefore part of a series, based at least partially on the same signal properties, e.g., duration T1, as well as the timestamps of the three sets being within a threshold time of each other.

Data structure 2402 includes an item number 2422, a timestamp 2424, a location 2426, and a transmission duration 2428. For example, data structure 2402 may result from execution of block 714 in FIG. 7. In data structure 2404, locations may be determined, such as by averaging, if there is more than one calculated location. However, in this example, averaging is not used since only one location is determined for each set of related signal strength information. Accordingly, for item 1, a location P1 is calculated based on the SS data in item 1 in data structure 2400. Similarly, for item 2, a location P2 is calculated based on the SS data in item 2 in data structure 2400. Similarly, for item 3, a location P3 is calculated based on the SS data in item 3 in data structure 2400.

Data structure 2404 includes an item number 2432, a sequence identifier 2434, a sensor ID 2436, a location 2438, and a note 2440. For example, at block 710 in FIG. 7, the gateway computing device may determine that item 1 in data structure 2400 may be determined to be contiguous with item 2 based on the timestamps being within a threshold time of each other and the signal properties being the same. Item 3 may be similarly determined to be contiguous with items 2 and items 1. Thus, items 1, 2 and 3 may be considered to be a series "S1" of the same data transmission flow. In addition, at block 804, the gateway computing device may determine that item 3 in data structure 2400 has the same timestamp as communication 1 in data structure 2200, and also has the same signal properties, e.g., transmission duration equals T1. Further, the gateway computing device may determine that the series of data transmissions in data structure 2400 is not finished at item 1 of data structure 2400, but is continued at items 2 and 3. Accordingly, at block 804 of FIG. 8, the gateway computing device determines that there is sensed data with the same timestamp (or within a threshold time sufficiently close to be considered the same) as the last signal strength data timestamp. At block 806 of FIG. 8, the gateway computing device determines that there is not a sensor with the same location and a different time stamp. However, at block 808, the gateway computing device determines that there are sensors with approximately the same timestamps but different locations. This indicates that the sensed data was transmitted by multiple sensors, and that one transmission was not caused by receiving the transmission from the other sensor. This indicates that a transmission was to destination other than the gateway computing device, which is anomalous behavior. Therefore, one of the data transmission corresponding to the signal strength transmissions of item 2 or item 3 was not necessary and was not received by the gateway computing device. Accordingly, items 2 and 3 of data structure 2404 may be considered to be anomaly candidates at block 810 of FIG. 8.

In the data structure 2404, items 1, 2, and 3 are indicated to be part of the same contiguous series "S1". Further, in item 1 of data structure 2404, the sensor ID X is associated with the location P1 calculated from the signal strength information included in item 1 of data structure 2400 based on being the earliest timestamp in the series S1. Additionally, in item 2 of data structure 2404, the sensor ID is indicated to be unknown, the location is identified as P2 calculated based on the information for item 2 in data structure 2400, and a note is added that this sensor is an anomaly candidate. In addition, in item 3 of data structure 2404, the sensor ID is also indicated to be unknown, the location is identified as P3 calculated based on the information for item 3 in data structure 2400, and a note is added that this sensor is an anomaly candidate.

FIG. 25 illustrates example data structures 2500 and 2502 for detecting anomalous sensors according to some implementations. The data structures 2500 and 2502 may be generated and/or maintained by the gateway computing device, and may be used when determining whether there are anomalous sensors, as discussed above, e.g., with respect to FIGS. 7 and 8.

Data structure 2500 is a sensor inventory data structure that includes an item number 2504, a sensor ID 2506, and a location 2508. For example, the sensor inventory data structure may be constructed by the gateway computing device and/or the management computing device when the sensor network is created, and may be updated as sensors are added or removed from the network and/or as the physical location of sensors changes in the network. As discussed above, at blocks 722 and 724 of FIG. 7, the sensor ID and location determined in data structure 2404 may be compared with the inventory data structure 2500. For example, if the location P2 is not associated with a sensor in the inventory data structure 2500, then the unknown sensor is marked as an anomaly candidate Additionally, the inventory data structure 2500 may be used to determine that the location of the third item P3 corresponds to sensor ID Y.

Data structure 2502 Data structure 2502 includes an item number 2512, a sensor ID 2514, a location 2516, and a note 2518. The data structure 2502 may be calculated by the gateway computing device based on data structure 2404 and historical sensor location information (not shown in FIG. 25) which may include previously determined locations for the sensors, if any. Further, the data structure 2502 may correspond to execution of blocks 718 and 720 of FIG. 7. In this example, suppose that for item 1, the locations of the sensor X and sensor Y are not recalculated since there is no historic location data or otherwise previously determined location data for sensor X or sensor Y. Further, item 2 remains unknown and is indicated to be an anomaly candidate to be investigated by a system administrator or other user of the system. Additionally, item 3 remains an anomaly candidate for investigation based on the close timestamp with item 2.

Figure 26:
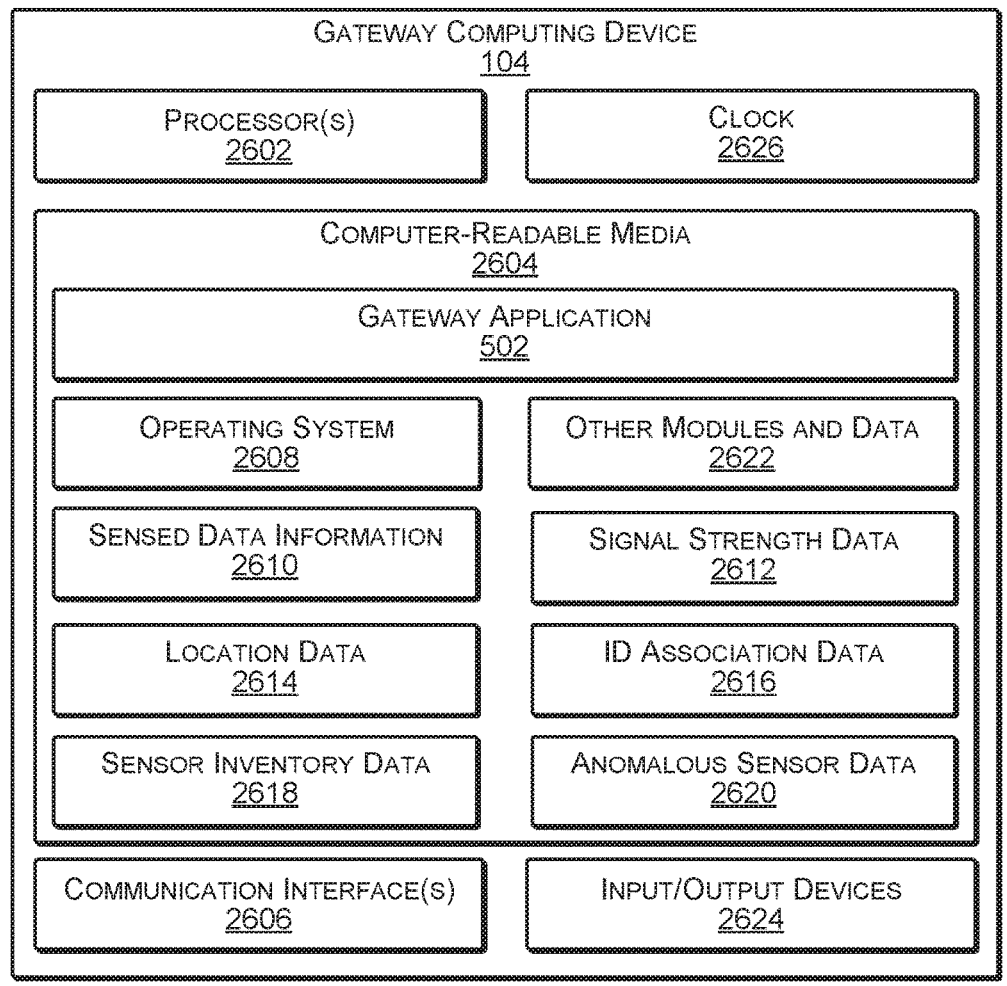
FIG. 26 illustrates an example gateway computing device according to some implementations.

FIG. 26 illustrates an example gateway computing device 104 according to some implementations. In some examples, the gateway computing device 104 may include one or more servers, personal computers, network computers, or other types of computing devices that may be embodied in any number of ways. In the illustrated example, the gateway computing device 104 includes, or may have associated therewith, one or more processors 2602, one or more computer-readable media 2604, and one or more communication interfaces 2606.

Each processor 2602 may be a single processing unit or a number of processing units, and may include single or multiple computing units, or multiple processing cores. The processor(s) 2602 can be implemented as one or more central processing units, microprocessors, microcomputers, microcontrollers, digital signal processors, state machines, logic circuits, and/or any devices that manipulate signals based on operational instructions. For instance, the processor(s) 2602 may be one or more hardware processors and/or logic circuits of any suitable type specifically programmed or configured to execute the algorithms and processes described herein. The processor(s) 2602 can be configured to fetch and execute computer-readable instructions stored in the computer-readable media 2604, which can program the processor(s) 2602 to perform the functions described herein.

The computer-readable media 2604 may include volatile and nonvolatile memory and/or removable and non-removable media implemented in any type of technology for storage of information such as computer-readable instructions, data structures, program modules, or other data. For example, the computer-readable media 2604 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that may be accessed by a computing device. Depending on the configuration of the gateway computing device 104, the computer-readable media 2604 may be a tangible non-transitory medium to the extent that, when mentioned, non-transitory computer-readable media exclude media such as energy, carrier signals, electromagnetic waves, and/or signals per se. In some cases, the computer-readable media 2604 may be at the same location as the gateway computing device 104, while in other examples, the computer-readable media 2604 may be partially remote from the gateway computing device 104.

The computer-readable media 2604 may be used to store any number of functional components that are executable by the processor(s) 2602. In many implementations, these functional components comprise instructions or programs that are executable by the processor(s) 2602 and that, when executed, specifically program the processor(s) 2602 to perform the actions attributed herein to the gateway computing device 104. Functional components stored in the computer-readable media 2604 may include the gateway application 502 described above with reference to FIG. 5. The gateway application 502 may include one or more computer programs, computer-readable instructions, executable code, or portions thereof that are executable to cause the processor(s) 2602 to perform various tasks, such as for receiving and processing data sent by the managed sensors and unmanaged sensors. Additionally, an operating system 2608 may control and manage various functions of the gateway computing device 104. In some cases, the functional components may be stored in a storage portion of the computer-readable media 2604, loaded into a local memory portion of the computer-readable media 2604, and executed by the one or more processors 2602. Numerous other software and/or hardware configurations will be apparent to those of skill in the art having the benefit of the disclosure herein.

In addition, the computer-readable media 2604 may store data and data structures used for performing the functions and services described herein. For example, the computer-readable media 2604 may store sensed data information 2610 received from the managed and unmanaged sensor, signal strength data 2612 received from the managed sensors, location data 2614 indicating the physical locations of managed and unmanaged sensors, and ID association data 2616 indicating sensor IDs associated with certain timestamps. In addition, the computer readable media 2604 may store sensor inventory data 2618 that includes an inventory of sensors in the sensor network, such as in the data structures 1500, 2000, 2500, and anomalous sensor data 2620 that includes information about candidate anomalous sensors determined using the techniques discussed above. The gateway computing device 104 may also include or maintain other functional components and data, such as other modules and data 2622, which may include programs, drivers, etc., and other data used or generated by the functional components. Further, the gateway computing device 104 may include many other logical, programmatic, and physical components, of which those described above are merely examples that are related to the discussion herein.

The communication interface(s) 2606 may include one or more interfaces and hardware components for enabling communication with various other devices, such as over the one or more networks 110, and/or with the managed and unmanaged sensors. Thus, the communication interfaces 2606 may include, or may couple to, one or more ports that provide connection to the network(s) 110 for communicating with the management computing device 102, as well as for communicating wirelessly with the managed and unmanaged sensors. For example, the communication interface(s) 2606 may enable communication through one or more of a LAN (local area network), WAN (wide area network), the Internet, cable networks, cellular networks, wireless networks (e.g., Wi-Fi) and wired networks (e.g., fiber optic, Ethernet, Fibre Channel,), direct connections, as well as close-range communications such as BLUETOOTH®, and the like, as additionally enumerated elsewhere herein.

In addition, the gateway computing device 104 may include one or more input/output (I/O) devices 2624. Such I/O devices 2624 may include a display, speakers, a microphone, and various user controls (e.g., buttons, a joystick, a mouse, a keyboard, a keypad, a touch screen, etc.), and so forth. Furthermore, the gateway computing device may include a clock 2626 for enabling timestamps to be determined. In some cases, the clock 2626 may be incorporated into the processor(s) 2602, while in other cases, the clock 2626 may be separate therefrom. The clock 2626 may regularly synchronized with other clocks in the sensor network to ensure accuracy of timestamps herein. for Additionally, the gateway computing device 104 may include various other components that are not shown, examples of which may include removable storage, a power source, antenna, and so forth.

Figure 27:
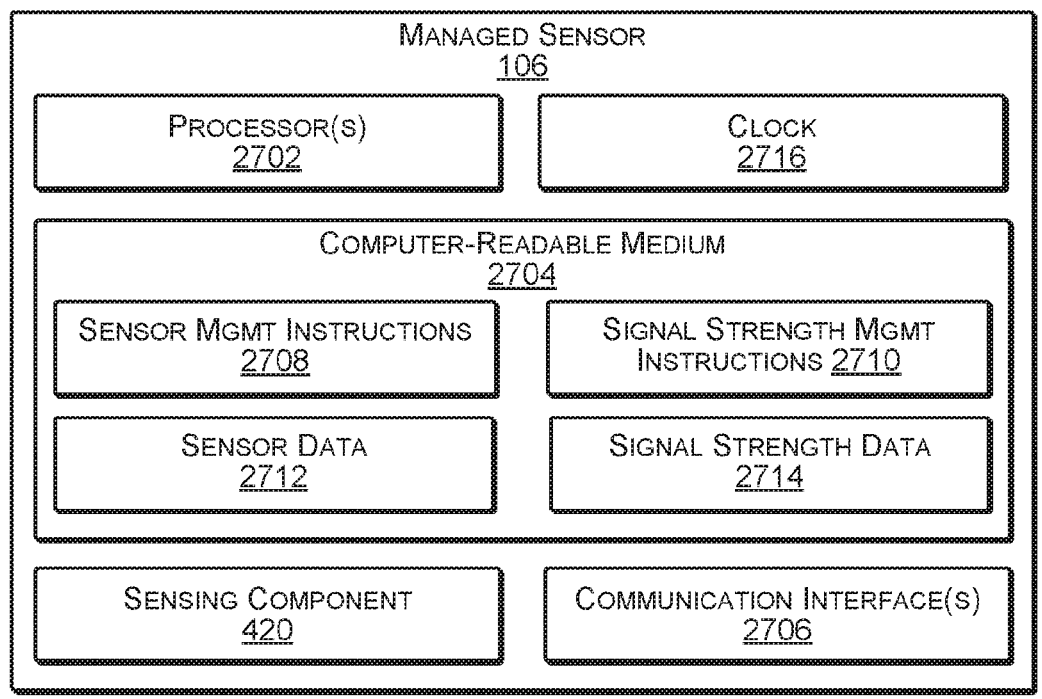
FIG. 27 illustrates an example managed sensor according to some implementations.

FIG. 27 illustrates an example managed sensor 106 according to some implementations. The managed sensor 106 may include at least limited computing, storage and transceiver capabilities to enable the managed sensor to receive and send data over a network. In some cases, the managed sensor 106 may detect transmissions of other sensors and may send signal strength information to the gateway computing device related to the transmissions of the other sensors. The managed sensor 106 and the other sensors herein may reside in any of a variety of environments for detecting any of a variety of data, as discussed elsewhere herein.

The managed sensor 106 may include at least one processor 2702, a computer-readable medium 2704, and one or more communication interfaces 2706. Each processor 2702 may be a single processing unit or a number of processing units, and may include single or multiple computing units, or multiple processing cores. The processor(s) 2702 can be implemented as one or more central processing units, microprocessors, microcomputers, microcontrollers, digital signal processors, state machines, logic circuitries, and/or any devices that manipulate signals based on operational instructions. For instance, the processor(s) 2702 may be one or more hardware processors and/or logic circuits of any suitable type specifically programmed or configured to execute the algorithms and processes described herein. The processor(s) 2702 may be configured to fetch and execute computer-readable instructions stored in the computer-readable medium 2704, which can program the processor(s) 2702 to perform the functions described herein.

The computer-readable medium 2704 may include volatile and nonvolatile memory and/or removable and non-removable media implemented in any type of technology for storage of information such as computer-readable instructions, data structures, program modules, or other data. For example, the computer-readable medium 2704 may include, but is not limited to, RAM, ROM, EEPROM, flash memory or other memory technology, or any other medium that can be used to store the desired information and that can be accessed by a computing device. Depending on the configuration of the managed sensor 106, the computer-readable medium 2704 may be a tangible non-transitory medium to the extent that, when mentioned, non-transitory computer-readable medium exclude media such as energy, carrier signals, electromagnetic waves, and/or signals per se.

The computer-readable medium 2704 may be used to store any number of functional components that are executable by the processor(s) 2702. In many implementations, these functional components comprise instructions or programs that are executable by the processor(s) 2702 and that, when executed, specifically program the processor(s) 2702 to perform the actions attributed herein to the managed sensor 106. Functional components stored in the computer-readable medium 2704 may include sensor management instructions 2708, which may include the sensing block 404 discussed above with respect to FIG. 4, and signal strength management instructions 2710, which may include the monitoring block 402 discussed above with respect to FIG. 4. The sensor management instructions 2708 and signal strength management instructions 2710 may include one or more computer programs, computer-readable instructions, executable code, executable modules, or portions thereof that are executable to cause the processor(s) 2702 to perform various tasks, such as for obtaining or otherwise receiving sensed data, detecting signal strengths, and sending transmissions to the gateway computing device 104. Numerous other software and/or hardware configurations will be apparent to those of skill in the art having the benefit of the disclosure herein.

In addition, the computer-readable medium 2704 may store, at least temporarily, data and data structures used for performing the functions and services described herein. For example, the computer-readable medium 2704 may include sensor data 2712 and signal strength data 2714. The managed sensor 106 may also include or maintain other functional components, data, and data structures, which may include programs, drivers, etc., and other data used or generated by the functional components.

The communication interface(s) 2706 may include one or more interfaces and hardware components for enabling communication with various other devices, such as through wireless communications. Thus, the communication interfaces 2706 may enable communication through one or more wireless networks (e.g., Wi-Fi, cellular, BLUETOOTH®) and, in some examples, wired networks (e.g., fiber optic, Ethernet, Fibre Channel,) or direct connections or combinations thereof.

In addition, the managed sensor 106 may include the sensing component 420 that may provide sensed data to the processor to be sent to the gateway computing device. Furthermore, the managed sensor 106 may include a clock 2716 for enabling timestamps to be determined. In some cases, the clock 2716 may be incorporated into the processor(s) 2702, while in other cases, the clock 2716 may be separate therefrom. The clock 2716 may be regularly synchronized with the gateway computing device clock to ensure accuracy of the timestamps herein. Further, in some examples herein the unmanaged sensors 108 may have a similar configuration, but might not include, or might not execute, the signal strength management instructions 2710.

Figure 28:
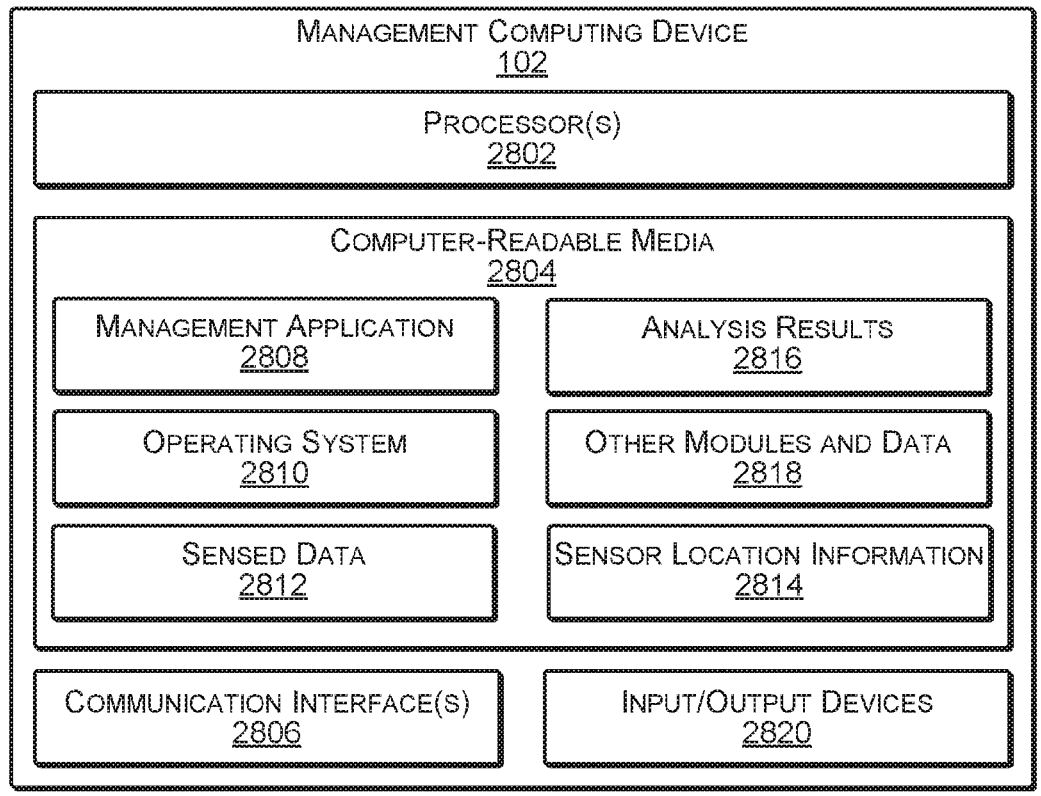
FIG. 28 illustrates an example management computing device according to some implementations.

FIG. 28 illustrates an example management computing device 102 according to some implementations. In some examples, the management computing device 102 may include one or more servers, personal computers, or other types of computing devices that may be embodied in any number of ways. For instance, in the case of a server, the modules, other functional components, and at least a portion of data storage may be implemented on at least one server, such as in a cluster of servers, a server farm or data center, a cloud-hosted computing service, and so forth, although other computer architectures may additionally or alternatively be used. In the illustrated example, the management computing device 102 includes, or may have associated therewith, one or more processors 2802, one or more communication interfaces 2806, and one or more computer-readable media 2804.

Each processor 2802 may be a single processing unit or a number of processing units, and may include single or multiple computing units, or multiple processing cores. The processor(s) 2802 can be implemented as one or more central processing units, microprocessors, microcomputers, microcontrollers, digital signal processors, state machines, logic circuitries, and/or any devices that manipulate signals based on operational instructions. For instance, the processor(s) 2802 may be one or more hardware processors and/or logic circuits of any suitable type specifically programmed or configured to execute the algorithms and processes described herein. The processor(s) 2802 can be configured to fetch and execute computer-readable instructions stored in the computer-readable media 2804, which can program the processor(s) 2802 to perform the functions described herein.

The computer-readable media 2804 may include volatile and nonvolatile memory and/or removable and non-removable media implemented in any type of technology for storage of information such as computer-readable instructions, data structures, program modules, or other data. For example, the computer-readable media 2804 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that may be accessed by a computing device. Depending on the configuration of the management computing device 102, the computer-readable media 2804 may be a tangible non-transitory medium to the extent that, when mentioned, non-transitory computer-readable media exclude media such as energy, carrier signals, electromagnetic waves, and/or signals per se. In some cases, the computer-readable media 2804 may be at the same location as the management computing device 102, while in other examples, the computer-readable media 2804 may be partially remote from the management computing device 102.

The computer-readable media 2804 may be used to store any number of functional components that are executable by the processor(s) 2802. In many implementations, these functional components comprise instructions or programs that are executable by the processor(s) 2802 and that, when executed, specifically program the processor(s) 2802 to perform the actions attributed herein to the management computing device 102. Functional components stored in the computer-readable media 2804 may include a management application 2808. The management application 2808 may include one or more computer programs, computer-readable instructions, executable code, or portions thereof that are executable to cause the processor(s) 2802 to perform various tasks, such as for receiving and processing data sent by the gateway computing device 104. Additionally, an operating system 2810 may control and manage various functions of the management computing device 102. In some cases, the functional components may be stored in a storage portion of the computer-readable media 2804, loaded into a local memory portion of the computer-readable media 2804, and executed by the one or more processors 2802. Numerous other software and/or hardware configurations will be apparent to those of skill in the art having the benefit of the disclosure herein.

In addition, the computer-readable media 2804 may store data and data structures used for performing the functions and services described herein. For example, the computer-readable media 2804 may store sensed data 2812 and sensor location information 2814 received from the gateway computing device 104. In some examples, management application 2808 may perform analysis of the received sensed data 2812 and the sensor location information 2814 to generate an analysis result 2816. The management computing device 102 may also include or maintain other modules and data 2818, which may include programs, drivers, etc., and other data used or generated by the functional components. Further, the management computing device 102 may include many other logical, programmatic, and physical components, of which those described above are merely examples that are related to the discussion herein.

The communication interface(s) 2806 may include one or more interfaces and hardware components for enabling communication with various other devices, such as over the one or more networks 110. Thus, the communication interfaces 2806 may include, or may couple to, one or more ports that provide connection to the network(s) 110 for communicating with the gateway computing device 104 or other computing devices. For example, the communication interface(s) 2806 may enable communication through one or more of a LAN (local area network), WAN (wide area network), the Internet, cable networks, cellular networks, wireless networks (e.g., Wi-Fi) and wired networks (e.g., fiber optic, Ethernet, Fibre Channel,), direct connections, as well as close-range communications such as BLU-ETOOTH®, and the like, as additionally enumerated elsewhere herein.

In addition, the management computing device 102 may include one or more input/output (I/O) devices 2820. Such I/O devices 2820 may include a display, speakers, a microphone, and various user controls (e.g., buttons, a joystick, a mouse, a keyboard, a keypad, a touch screen, etc.), and so forth.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as program modules stored on computer-readable media, and executed by the processor(s) herein. Generally, program modules include routines, programs, objects, components, data structures, executable code, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:
1. A system comprising:
one or more processors; and
one or more non-transitory computer-readable media maintaining executable instructions, which, when executed by the one or more processors, program the one or more processors to perform operations comprising:

receiving sensed data information sent in a data transmission from a first sensor, the sensed data information including a first sensor identifier (ID) and sensed data of the first sensor;

associating a first timestamp with the sensed data information;

receiving, from a second sensor, a first information transmission including first signal strength information including first signal strength data and a first signal duration related to a first detected transmission detected by the second sensor, and a second timestamp corresponding to a time of detection of the first detected transmission by the second sensor;

receiving, from a third sensor, a second information transmission including second signal strength information including second signal strength data and a second signal duration related to a second detected transmission detected by the third sensor, and a third timestamp corresponding to a time of detection of the second detected transmission by the third sensor;

comparing the second timestamp with the third timestamp and the first signal duration with the second signal duration;

determining that the first detected transmission and the second detected transmission both correspond to a transmission sent by a same detected sensor based at least in part on the second timestamp being within a threshold time of the third timestamp and the first signal duration matching the second signal duration;

based on determining that the first detected transmission and the second detected transmission correspond to the transmission sent by the same detected sensor, determining, based at least partially on the first signal strength data and the second signal strength data, an indicated location of the detected sensor; and when the indicated location of the detected sensor does not correspond to a known sensor location, indicating that the detected sensor is associated with an anomaly.

2. The system as recited in claim 1, the operations further comprising:

when at least one of the second timestamp or the third timestamp is at a timing after the first timestamp, indicating that the detected sensor is associated with an anomaly.

3. The system as recited in claim 1, the operations further comprising:

searching a sensor inventory data structure for a location corresponding to the indicated location of the detected sensor; and associating a second sensor ID with the indicated location based on matching a location associated with the second sensor ID in the inventory data structure with the indicated location.

4. The system as recited in claim 1, the operations further comprising:

receiving, from a fourth sensor, a third information transmission including third signal strength information including third signal strength data and a third signal duration related to a third detected transmission detected by the fourth sensor, and a fourth timestamp corresponding to a time of detection of the third detected transmission by the fourth sensor;

based on the fourth timestamp being within a threshold time of the second timestamp and the third timestamp, and the third signal duration matching the first signal duration and the second signal duration, determining the indicated location based on the third signal strength data in addition to the first signal strength data and the second signal strength data.

5. The system as recited in claim 1, the operations further comprising:

receiving, from a fourth sensor, a third information transmission including third signal strength information including third signal strength data and a third signal duration related to a third detected transmission detected by the fourth sensor, and a fourth timestamp corresponding to a time of detection of the third detected transmission by the fourth sensor;

determining a first location based at least partially on the second signal strength information;

determining a second location based at least partially on the third signal strength information; and when the first location is different from the second location, and the second timestamp is within a threshold time of the fourth timestamp, indicating that a sensor associated with at least one of the first location or the second location is associated with an anomaly.

6. The system as recited in claim 1, wherein the first signal strength data is indicative of a distance from the detected sensor to the second sensor.

7. The system as recited in claim 1, the operations further comprising sending a notification to a computing device over a network indicating association of an anomaly with the detected sensor.

8. A method comprising:

receiving, by a processor, sensed data of a first sensor sent in a first data transmission;

associating a first timestamp with the sensed data;

receiving, from a second sensor, a first information transmission including first signal strength information including first signal strength data and a first signal duration related to a first detected transmission detected by the second sensor, and a second timestamp corresponding to a time of detection of the first detected transmission by the second sensor;

receiving, from a third sensor, a second information transmission including second signal strength information including second signal strength data and a second signal duration related to a second detected transmission detected by the third sensor, and a third timestamp corresponding to a time of detection of the second detected transmission by the third sensor;

comparing the second timestamp with the third timestamp and the first signal duration with the second signal duration;

determining that the first detected transmission and the second detected transmission both correspond to a transmission sent by a same detected sensor based at least in part on the second timestamp being within a threshold time of the third timestamp and the first signal duration matching the second signal duration;

based on determining that the first detected transmission and the second detected transmission correspond to the transmission sent by the same detected sensor, determining, based at least partially on the first signal strength data and the second signal strength data, an indicated location of the detected sensor; and when the indicated location of the detected sensor does not correspond to a known sensor location, indicating an anomaly.

9. The method as recited in claim 8, further comprising:
when at least one of the second timestamp or the third timestamp is at a timing after the first timestamp, indicating that the detected sensor is associated with an anomaly.

10. The method as recited in claim 8, further comprising:
searching a sensor inventory data structure for a location corresponding to the indicated location of the detected sensor; and
associating a second sensor ID with the indicated location based on matching a location associated with the second sensor ID in the inventory data structure with the indicated location.

11. The method as recited in claim 8, further comprising:
receiving, from a fourth sensor, a third information transmission including third signal strength information including third signal strength data and a third signal duration related to a third detected transmission detected by a fourth sensor, and a fourth timestamp corresponding to a time of detection of the third detected transmission by the fourth sensor;
based on the fourth timestamp being within a threshold time of the second timestamp and the third timestamp, and the third signal duration matching the first signal duration and the second signal duration, determining the indicated location based on the third signal strength data in addition to the first signal strength data and the second signal strength data.

12. The method as recited in claim 8, further comprising:
receiving, from a fourth sensor, a third information transmission including third signal strength information including third signal strength data and a third signal duration related to a third detected transmission detected by the fourth sensor, and a fourth timestamp corresponding to at time of detection of the third detected transmission by the fourth sensor;
determining a first location based at least partially on the second signal strength information;
determining a second location based at least partially on the third signal strength information; and
when the first location is different from the second location, and the second timestamp is within a threshold time of the fourth timestamp, indicating that a sensor associated with at least one of the first location or the second location is associated with an anomaly.

13. The method as recited in claim 8, wherein the first signal strength data is indicative of a distance from the detected sensor to the second sensor.

14. The method as recited in claim 8, further comprising sending a notification to a computing device over a network indicating association of an anomaly with the detected sensor.

15. One or more non-transitory computer-readable media maintaining instructions which, when executed by one or more processors, cause the one or more processors to perform operations comprising:
receiving, by a processor, sensed data of a first sensor sent in a first data transmission;
associating a first timestamp with the sensed data;
receiving, from a second sensor, a first information transmission including first signal strength information including first signal strength data and a first signal duration related to a first detected transmission detected by the second sensor, and a second timestamp corresponding to a time of detection of the first detected transmission by the second sensor;
receiving, from a third sensor, a second information transmission including second signal strength information including second signal strength data and a second signal duration related to a second detected transmission detected by the third sensor, and a third timestamp corresponding to a time of detection of the second detected transmission by the third sensor;
comparing the second timestamp with the third timestamp and the first signal duration with the second signal duration;
determining that the first detected transmission and the second detected transmission both correspond to a transmission sent by a same detected sensor based at least in part on the second timestamp being within a threshold time of the third timestamp and the first signal duration matching the second signal duration;
based on determining that the first detected transmission and the second detected transmission correspond to the transmission sent by the same detected sensor, determining, based at least partially on the first signal strength data and the second signal strength data, an indicated location of the detected sensor; and
when the indicated location of the detected sensor does not correspond to a known sensor location, indicating an anomaly.

16. The one or more non-transitory computer-readable media as recited in claim 15, wherein the operations further comprise:
when at least one of the second timestamp or the third timestamp is after the first timestamp, indicating that the detected sensor is associated with an anomaly.

17. The one or more non-transitory computer-readable media as recited in claim 15, wherein the operations further comprise:
searching a sensor inventory data structure for a location corresponding to the indicated location of the detected sensor; and
associating a second sensor ID with the indicated location based on matching a location associated with the second sensor ID in the inventory data structure with the indicated location.

18. The one or more non-transitory computer-readable media as recited in claim 15, wherein the operations further comprise:
receiving, from a fourth sensor, a third information transmission including third signal strength information including third signal strength data and a third signal duration related to a third detected transmission detected by the fourth sensor, and a fourth timestamp corresponding to a time of detection of the third detected transmission by the fourth sensor;
based on the fourth timestamp being within a threshold time of the second timestamp and the third timestamp, and the third signal duration matching the first signal duration and the second signal duration, determining the indicated location based on the third signal strength data in addition to the first signal strength data and the second signal strength data.

19. The one or more non-transitory computer-readable media as recited in claim 15, wherein the operations further comprise:
receiving, from a fourth sensor, a third information transmission including third signal strength information including third signal strength data and a third signal duration related to a third detected transmission detected by the fourth sensor, and a fourth timestamp corresponding to a time of detection of the third detected transmission by the fourth sensor;

determining a first location based at least partially on the second signal strength information;

determining a second location based at least partially on the third signal strength information; and when the first location is different from the second location, and the second timestamp is within a threshold time of the fourth timestamp, indicating that a sensor associated with at least one of the first location or the second location is associated with an anomaly.

20. The one or more non-transitory computer-readable media as recited in claim 15, wherein the first signal strength data is indicative of a distance from the detected sensor to the first sensor.

\* \* \* \* \*